(12) United States Patent
Kitahata et al.

(10) Patent No.: US 8,708,089 B2
(45) Date of Patent: Apr. 29, 2014

(54) VEHICLE STEERING APPARATUS

(75) Inventors: Kouji Kitahata, Minamikawachi-gun (JP); Shiro Nakano, Minamikawachi-gun (JP); Masaya Segawa, Yamatokoriyama (JP); Yoshiharu Nogami, Osaka (JP)

(73) Assignee: Jtekt Corporation, Osaka-shi (JP)

( * ) Notice: Subject to any disclaimer, the term of this patent is extended or adjusted under 35 U.S.C. 154(b) by 332 days.

(21) Appl. No.: 13/054,382

(22) PCT Filed: Jul. 15, 2009

(86) PCT No.: PCT/JP2009/003342
§ 371 (c)(1),
(2), (4) Date: Jan. 14, 2011

(87) PCT Pub. No.: WO2010/007784
PCT Pub. Date: Jan. 21, 2010

(65) Prior Publication Data
US 2011/0120797 A1    May 26, 2011

(30) Foreign Application Priority Data

| Jul. 15, 2008 | (JP) | 2008-184331 |
| Jul. 15, 2008 | (JP) | 2008-184332 |
| Jul. 15, 2008 | (JP) | 2008-184333 |
| Jul. 15, 2008 | (JP) | 2008-184334 |
| Oct. 21, 2008 | (JP) | 2008-271236 |
| Dec. 12, 2008 | (JP) | 2008-316574 |

(51) Int. Cl.
*B62D 5/04* (2006.01)
*B62D 5/00* (2006.01)

(52) U.S. Cl.
CPC ........... *B62D 5/0409* (2013.01); *B62D 5/04* (2013.01); *B62D 5/00* (2013.01)
USPC ................................................. 180/443; 475/4

(58) Field of Classification Search
CPC ........... B62D 5/0409; B62D 5/04; B62D 5/00
USPC .......... 180/443, 444, 412, 410, 431; 475/2, 3, 475/4

See application file for complete search history.

(56) References Cited

U.S. PATENT DOCUMENTS

| 5,671,637 A | 9/1997 | Joerg et al. |
| 5,810,111 A | 9/1998 | Takeuchi et al. |

(Continued)

FOREIGN PATENT DOCUMENTS

| DE | 44 08 828 A1 | 10/1995 |
| JP | U-48-43322 | 12/1973 |

(Continued)

OTHER PUBLICATIONS

International Preliminary Report on Patentability issued in International Application No. PCT/JP2009/003342 on Feb. 8, 2011 (with translation).

(Continued)

*Primary Examiner* — Tony H. Winner
*Assistant Examiner* — Jacob Knutson
(74) *Attorney, Agent, or Firm* — Oliff PLC

(57) ABSTRACT

A vehicle steering apparatus includes an actuator that generates a steering force, and a first speed reduction mechanism connected to the actuator. To the first speed reduction mechanism, a second speed reduction mechanism is connected. To the second speed reduction mechanism, a steering mechanism is connected. A sub-assembly including the actuator and the first speed reduction mechanism is configured.

17 Claims, 31 Drawing Sheets

(56) References Cited

U.S. PATENT DOCUMENTS

| | | | |
|---|---|---|---|
| 6,026,924 A * | 2/2000 | Godek | 180/444 |
| 6,194,849 B1 | 2/2001 | Wilson-Jones et al. | |
| 6,211,631 B1 | 4/2001 | Wilson-Jones et al. | |
| 6,262,547 B1 | 7/2001 | Kifuku et al. | |
| 6,390,230 B1 * | 5/2002 | Shimizu et al. | 180/444 |
| 6,481,526 B1 | 11/2002 | Millsap et al. | |
| 6,896,090 B2 * | 5/2005 | Kanda et al. | 180/402 |
| 2002/0175574 A1 | 11/2002 | Okazaki et al. | |
| 2005/0230178 A1* | 10/2005 | Chikaraishi et al. | 180/444 |
| 2006/0166771 A1* | 7/2006 | Yamanaka et al. | 475/4 |
| 2006/0175099 A1 | 8/2006 | Jung et al. | |
| 2007/0246807 A1 | 10/2007 | Hara et al. | |
| 2007/0261909 A1* | 11/2007 | Higashi et al. | 180/446 |

FOREIGN PATENT DOCUMENTS

| | | |
|---|---|---|
| JP | A-63-196859 | 8/1988 |
| JP | A-63-210461 | 9/1988 |
| JP | U-1-135256 | 9/1989 |
| JP | A-2-28063 | 1/1990 |
| JP | U-7-16052 | 3/1995 |
| JP | A-8-230696 | 9/1996 |
| JP | A-8-258728 | 10/1996 |
| JP | A-8-258730 | 10/1996 |
| JP | A-11-49013 | 2/1999 |
| JP | A-2000-500102 | 1/2000 |
| JP | A-2002-37100 | 2/2002 |
| JP | A-2002-193121 | 7/2002 |
| JP | A-2002-354755 | 12/2002 |
| JP | A-2003-11834 | 1/2003 |
| JP | A-2004-224280 | 8/2004 |
| JP | A-2004-338553 | 12/2004 |
| JP | A-2005-53416 | 3/2005 |
| JP | A-2005-119578 | 5/2005 |
| JP | A-2007-283892 | 11/2007 |
| JP | A-2007-293982 | 11/2007 |

OTHER PUBLICATIONS

International Search Report issued in International Application No. PCT/JP2009/003342 on Oct. 27, 2009 (with translation).

Jan. 7, 2013 Extended European Search Report issued in European Patent Application No. 09797712.8.

* cited by examiner

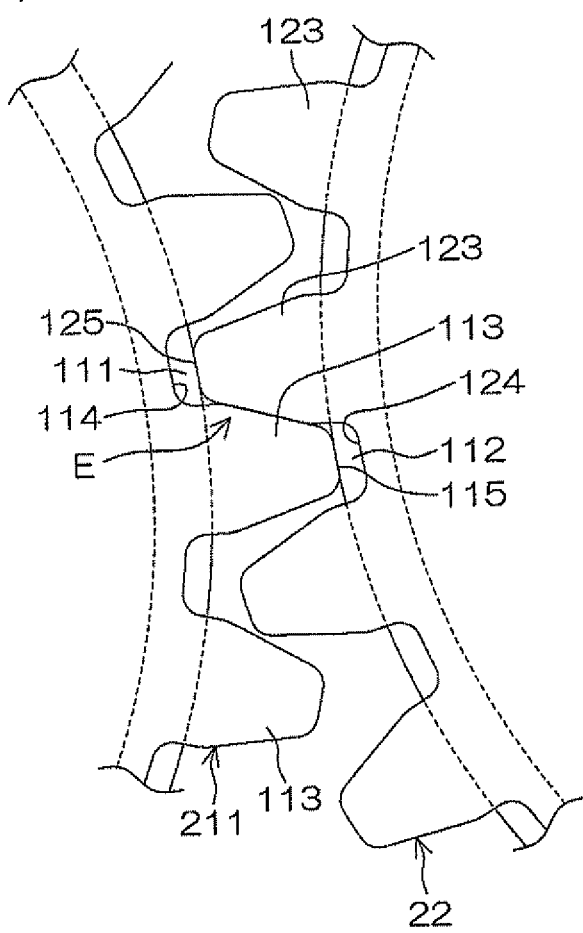

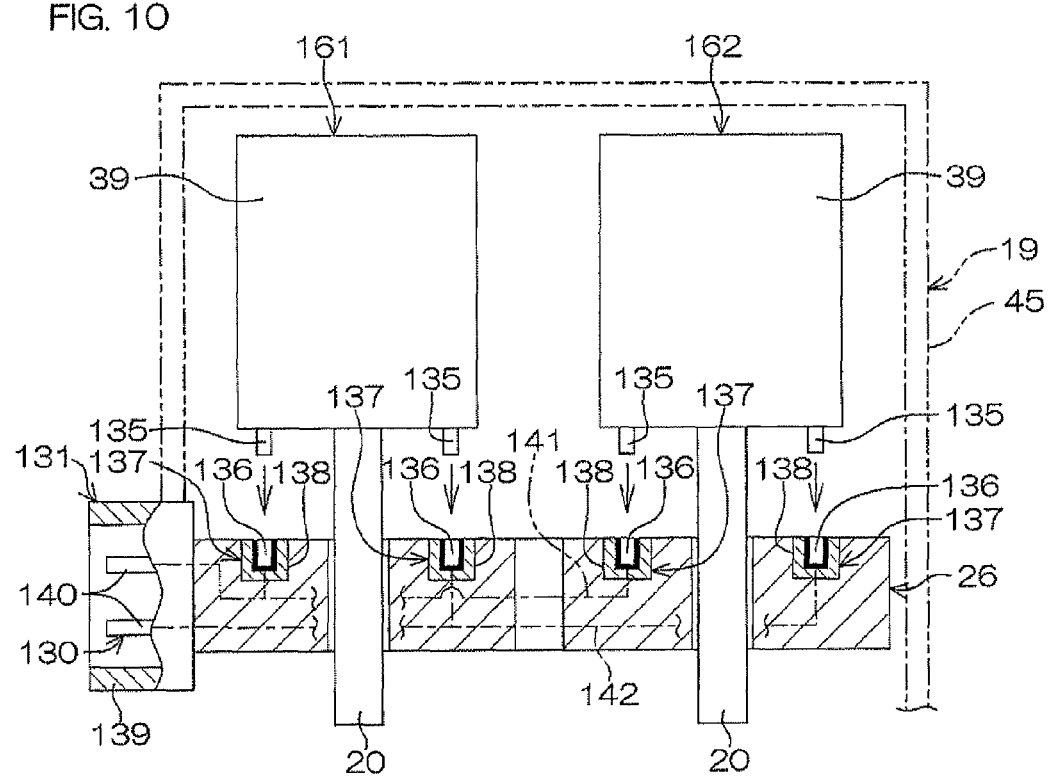

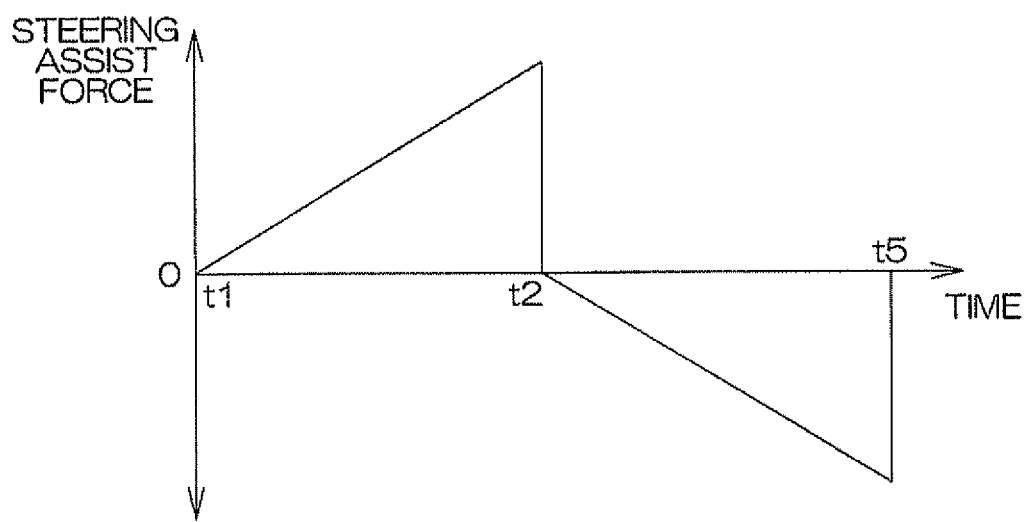

VEHICLE STEERING APPARATUS

TECHNICAL FIELD

The present invention relates to a vehicle steering apparatus.

BACKGROUND ART

As a vehicle steering apparatus, an electric power steering device is proposed that assists steering by applying a torque from each of a plurality of electric motors to a steering mechanism via a clutch and a speed reduction mechanism (for example, refer to Patent Document 1).

As an electric power steering device equipped with a plurality of electric motors, there is one in that, for compensating inertia of a certain electric motor, another electric motor is driven.

On the other hand, in a conventional electric power steering device equipped with a single electric motor, inertia of the electric motor is compensated by calculating a compensating electric current and adding the calculated compensating electric current to an electric current that should be supplied to the electric motor.

On the other hand, in an electric power steering device equipped with a plurality of electric motors, inertia of a certain electric motor is compensated mechanically by another electric motor.

As a conventional electric power steering device equipped with a single electric motor, an electric power steering device is conventionally proposed which eliminates torque loss caused by static friction of the electric motor by adding a dither current to an electric current for controlling the electric motor (refer to Patent Document 2).

Further, there is an electric power steering device that is equipped with a single electric motor and eliminates an uncomfortable feeling in steering due to a dead zone by supplying a dither signal to the electric motor when a duty ratio to be applied to a motor driving circuit is not more than a predetermined value (refer to Patent Document 3).

PRIOR ART DOCUMENT

Patent Documents

Patent Document 1: Japanese Published Unexamined Patent Application No. H08-258728
Patent Document 2: Japanese Published Unexamined Patent Application No. H11-49013
Patent Document 3: Japanese Published Unexamined Patent Application No. 2003-11834

SUMMARY OF THE INVENTION

Problem to be Solved by the Invention

When a plurality of electric motors are used, it takes time to assemble them. Further, various specifications required for the electric power steering device cannot be easily satisfied.

When a plurality of electric motors are used, the number of gear engagement portions in the speed reduction mechanism increases. Therefore, vibration and noise increase.

In an electric power steering device using a dither signal for motor control as in the case of Patent Documents 2 and 3, the influence of static friction on the electric motor can be eliminated or reduced.

However, in an electric power steering device equipped with two electric motors mechanically joined to each other, inertia or friction, etc., of one electric motor causes delay of the other electric motor. Further, when an electric motor that assists steering is switched, electric or mechanical delay is caused by various time constants including friction and inertia of the electric motors and the steering system and a dead zone of the control system.

Such delay cannot be eliminated only by always supplying a dither signal as in the configuration described in Patent Document 2 described above or supplying a dither signal when the duty ratio is not more than a predetermined value as in the configuration of Patent Document 3 to the two electric motors.

Means for Solving the Problem

An object of the present invention is to provide a vehicle steering apparatus that is easily assembled and easily satisfies various specifications. Further, another object of the present invention is to provide a vehicle steering apparatus that suppresses noise. Still another object of the present invention is to provide a vehicle steering apparatus that can eliminate or reduce delay caused by friction or inertia, etc., of the electric motors.

In order to achieve the above-described objects, according to an aspect of the present invention, a vehicle steering apparatus includes an actuator that generates a steering force, a first speed reduction mechanism connected to the actuator, a second speed reduction mechanism connected to the first speed reduction mechanism, and a steering mechanism connected to the second speed reduction mechanism. A vehicle steering apparatus including a sub-assembly that includes the actuator and the first speed reduction mechanism is provided.

In the present aspect, the actuator and the first speed reduction mechanism are unitized, so that, for example, by commonly using the actuator and changing the speed reduction ratio of the first speed reduction mechanism, the specifications of the unit can be easily changed. Therefore, the present aspect can be easily applied to vehicle steering apparatuses with various characteristics. Further, the actuator and the first speed reduction mechanism can be assembled in advance as a sub-assembly, so that assembly performance is high.

According to an aspect of the present invention, it is preferable that the actuator includes an electric motor having a rotary shaft, the first speed reduction mechanism includes a drive member and a driven member follows the drive member, and the rotary shaft of the electric motor and a pivot of the driven member are parallel to each other. In this case, the drive member and the driven member can be disposed at the same position in the axial direction of the rotary shaft of the electric motor, so that the sub-assembly can be downsized in the axial direction of the rotary shaft of the electric motor, and eventually, the vehicle steering apparatus can be downsized.

According to an aspect of the present invention, it is preferable that the drive member and the driven member of the first speed reduction mechanism include gears engaging with each other or pulleys joined to each other in a power transmittable manner via an endless belt. When gear transmission is used, power transmission is reliable. In particular, helical gears are used, the contact ratio of the teeth can be increased, and this is preferable for transmitting a high output. When an endless belt is used, the degree of freedom of layout of the endless belt is high, so that the degree of freedom of installation of the drive member and the driven member can be increased. Eventually, it becomes possible to install the vehicle steering apparatus in a narrow space.

According to an aspect of the present invention, it is preferable that the driven member includes two helical gears joined to the same axis, and tooth trace directions of the two helical gears are different from each other. In this case, axial components (thrust forces) of driving reaction forces to be applied to the two helical gears act in directions opposite to each other and cancel each other. As a result, at the time of high-speed rotation, deterioration in the transmission efficiency of the gears caused by the thrust forces can be suppressed. Specifically, the transmission efficiency of the first speed reduction mechanism can be improved.

According to an aspect of the present invention, it is preferable that the actuator includes a plurality of electric motors each of which includes a rotary shaft, the first speed reduction mechanism includes a plurality of drive members and a driven member that follows the drive members, and the drive members are connected to rotary shafts of the corresponding electric motors, and joined to the driven member in a power transmittable manner. In this case, the plurality of motors can be arranged side by side, and each drive member and driven member connected to the rotary shaft of the corresponding electric motor can be disposed at the same position in the axial direction of the rotary shaft. Therefore, in the axial direction of the rotary shaft of the electric motor, the sub-assembly can be further downsized, and eventually, the vehicle steering apparatus can be further downsized.

According to an aspect of the present invention, it is preferable that the actuator includes a plurality of electric motors each of which includes a rotary shaft, the first speed reduction mechanism includes a plurality of drive members and a driven member joined to each other in a power transmittable manner via an endless belt, the drive members are joined to rotary shafts of the corresponding electric motors rotatably integrally, and the plurality of drive members include a drive member inscribed about the endless belt and a drive member circumscribed about the endless belt. In this case, the drive member circumscribed about the endless belt and the drive member inscribed about the endless belt apply tensions to the endless belt so as to press the endless belt against the other drive member. Therefore, it is unnecessary to provide a tensioner separately, and the structure can be simplified.

According to an aspect of the present invention, it is preferable that the vehicle steering apparatus includes a rotation angle detection device that detects a rotation angle of the rotary shaft of any one of the plurality of electric motors, or any one of the drive members and the driven member. Specifically, when a plurality of electric motors are used, detection of the rotation angles of the electric motors can be replaced by detection of a rotation angle of any one of the electric motors, any one of the drive members or any one of the driven member. Therefore, the structure can be greatly simplified.

According to an aspect of the present invention, it is preferable that the vehicle steering apparatus includes a rotation angle detection device that detects a rotation angle of the driven member. Specifically, a rotation angle of the driven member that rotates in conjunction with the rotary shaft of the electric motor is detected, so that the rotation angle detection device conventionally used inside the electric motor can be omitted.

According to an aspect of the present invention, it is preferable that the first speed reduction mechanism includes a drive member connected to the actuator and a driven member that follows the drive member, and in a power transmission region between the drive member and the driven member, a plurality of resilient bodies are interposed in a compressed state between the drive member and the driven member, and the plurality of resilient bodies apply resilient forces different from each other. In this case, the plurality of resilient bodies the resilient forces of which are different from each other and which are interposed between the drive member and the driven member show buffering characteristics (for example, frequency characteristics) different from each other, so that vibration and noise of the first speed reduction mechanism can be suppressed in a wide range.

According to an aspect of the present invention, it is preferable that the vehicle steering apparatus further includes a connection member that electrically connects the actuator to external wiring, and the sub-assembly includes a housing for housing the actuator and the first speed reduction mechanism, the connection member includes first and second terminals connectable to each other according to an operation of joining the actuator and the housing to each other, and the first and second terminals are disposed inside the housing. In this case, simultaneously with joining between the actuator and the housing for assembly, the first and second terminals of the connection member for electrically connecting the actuator to external wiring can be connected to each other, so that the assembly operation becomes very easy.

According to an aspect of the present invention, it is preferable that the actuator includes a plurality of electric motors, the housing includes a motor fixing member to which the plurality of electric motors are fixed, and the first terminal is provided on the plurality of electric motors, and the second terminal is provided on internal coupler fixed to the motor fixing member. In this case, simultaneously with fixation of the electric motors to the motor fixing member, the first terminal of the electric motors can be connected to the second terminal of the internal coupler fixed to the motor fixing member, so that the connecting operation can be simplified.

According to an aspect of the present invention, it is preferable that the actuator includes a plurality of electric motors, the housing includes a motor fixing member to which the plurality of electric motors are fixed, and a cover housing covering the plurality of electric motors and the motor fixing member, the plurality of electric motors are disposed and between an inner surface of an end wall of the cover housing and the motor fixing member, and the first terminal is provided on the plurality of electric motors, and the second terminal is provided on internal coupler fixed to the inner surface of the end wall of the cover housing. In this case, at the time of assembly, simultaneously with covering of the plurality of electric motors, etc., by the cover housing, the first terminal of the electric motors can be connected to the second terminal of the internal coupler fixed to the inner surface of the end wall of the cover housing, so that the connecting operation can be simplified.

According to an aspect of the present invention, it is preferable that the connection member includes an external coupler disposed on the outer surface of the cover housing, the external coupler includes third terminal, and the second terminal and the third terminal are connected to each other via a flexible printed board installed along an inner surface of the cover housing. In this case, an electric cable that is usually used for the electric motor can be omitted. The flexible printed board does not need a large space, and layout thereof is easy. The flexible printed board means FPC (Flexible Printed Circuit).

According to an aspect of the present invention, it is preferable that the first speed reduction mechanism includes a drive member connected to the actuator, and an annular driven member that follows the drive member, and an inner periphery of the driven member is joined to the drive member in a power transmittable manner, and a lubricant is filled in a power transmission region between the drive member and the driven member. In this case, the drive member is inscribed about the annular driven member. The lubricant is subjected to a centrifugal force caused by rotation of the driven member and collected to the inner periphery of the drive member, so that the lubricant can be sufficiently held on the inner periphery of the driven member. Therefore, vibration and noise in the power transmission region between the drive member and the driven member can be reduced. As the lubricant, a lubricant composition containing a base oil, polymer, and a thickener is preferably used for noise prevention.

According to an aspect of the present invention, it is preferable that the sub-assembly includes a housing for housing the actuator and the first speed reduction mechanism, and the lubricant is filled in the housing. In this case, the first speed reduction mechanism can be sufficiently lubricated by the lubricant filled in the housing.

According to an aspect of the present invention, it is preferable that the first speed reduction mechanism includes a drive member connected to the actuator, an annular driven member having an inner periphery joined to the drive member in a power transmittable manner, and a bearing supporting an outer periphery of the driven member. In this case, the bearing supports the outer periphery of the driven member, so that at least a part of the driven member and the bearing can be disposed at the same position in the axial direction of the driven member. As a result, in the axial direction of the driven member, the first speed reduction mechanism can be downsized. In particular, when a double-reduction system using the first and second speed reduction mechanisms is used, the vehicle steering apparatus can be downsized.

According to an aspect of the present invention, it is preferable that the actuator includes a plurality of electric motors, and the plurality of electric motors include a first electric motor that generates a leftward steering force that should be applied to the steering mechanism or a rightward steering reaction force that should be applied to the steering member to be operated by a driver, a second electric motor that generates a rightward steering reaction force that should be applied to the steering mechanism or a leftward steering reaction force that should be applied to the steering member, a turning-back detection device that detects a turning-back operation of the steering member, and a drive control section that drives either one of the first and second electric motors to generate a steering force or a steering reaction force in a corresponding direction, and supplies a driving electric current that does not generate a steering force or a steering reaction force to the other one of the first and second electric motors when the turning-back operation is not detected by the turning-back detection device.

In this case, when a turning-back operation is not detected by the turning-back detection device, one of the electric motors is driven to generate a steering force in a corresponding direction, and a driving electric current (for example, a dither current) that does not generate a steering force is supplied to the other electric motor, so that by this driving electric current, delay caused by friction, etc., of the other electric motor (for example, rightward steering motor) with respect to one electric motor (for example, leftward steering motor) can be reduced (eliminated, ideally).

According to an aspect of the present invention, it is preferable that the turning-back detection device includes a direction detection device that detects a direction of steering by the driver, and when the direction detection device detects a leftward operation, the drive control section drives the first electric motor in a corresponding direction, and when the turning-back detection device detects the leftward operation as the leftward turning-back operation, the drive control section supplies an electric current that is for rotation in a direction opposite to the corresponding direction and compensates inertia caused when the rotation direction of the second electric motor mechanically joined to the first electric motor is reversed to the second electric motor, and when the direction detection device detects a rightward operation, the drive control section drives the second electric motor in a corresponding direction, and when the turning-back detection device detects the rightward operation as the rightward turning-back operation, the drive control section supplies an electric current for compensating the inertia to the first electric motor. In this case, by the electric current that compensates the inertia, influences of mechanical and electric delays including delays caused by inertia of the other electric motor with respect to the first electric motor can be reduced (eliminated, ideally).

BRIEF DESCRIPTION OF THE DRAWINGS

FIG. 7 is a general view showing engagement between the drive gear and the driven gear.

FIG. 10 is a general view showing steps of attaching the electric motors to a motor fixing plate.

FIG. 39 is a diagram showing an example of a time-related change in steering assist force when compensation by an inertia compensating electric current is performed in the embodiment of FIG. 34.

BEST MODE FOR CARRYING OUT THE INVENTION

Preferred embodiments of the present invention will be described with reference to the accompanying drawings.

Figure 1:
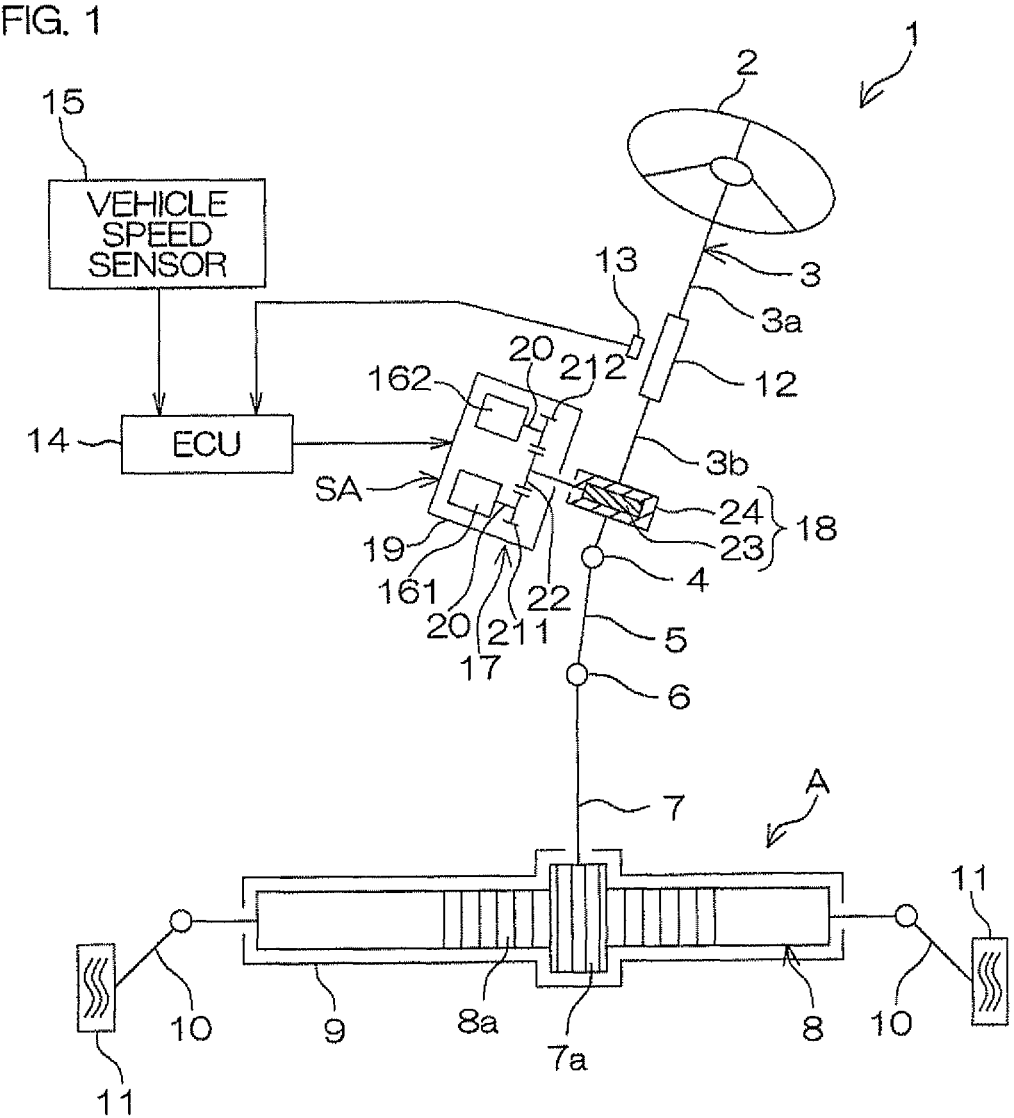
FIG. 1 is a schematic view showing a general configuration of an electric power steering device as a vehicle steering apparatus of an embodiment of the present invention.

FIG. 1 is a general view schematically showing a configuration of an electric power steering device as a vehicle steering apparatus of an embodiment of the present invention.

Referring to FIG. 1, the electric power steering device 1 includes a steering shaft 3 joined to a steering member 2 such as a steering wheel, and an intermediate shaft 5 joined to the steering shaft 3 via a universal joint 4. The electric power steering device 1 includes a pinion shaft 7 joined to the intermediate shaft 5 via the universal joint 6, and a rack bar 8 as a steered shaft having rack teeth 8a that engage with pinion teeth 7a provided near an end portion of the pinion shaft 7 and extending in the left-right direction of a vehicle. The pinion shaft 7 and the rack bar 8 constitute a steering mechanism A consisting of a rack-and-pinion mechanism.

The rack bar 8 is supported inside a housing 9 fixed to a vehicle body via a plurality of bearings (not shown) so as to reciprocate linearly. Both end portions of the rack bar 8 project to both sides of the housing 9, and to each end portion, a tie rod 10 is coupled. Each tie rod 10 is joined to a corresponding steered wheel 11 via a corresponding knuckle arm (not shown).

When the steering member 2 is operated and the steering shaft 3 is rotated, this rotation is converted into linear movement of the rack bar 8 along the left-right direction of the vehicle by the pinion teeth 7a and the rack teeth 8a. Accordingly, turning of the steered wheels 11 is realized.

The steering shaft 3 is divided into an upper shaft 3a on the input side connected to the steering member 2 and a lower shaft 3b on the output side connected to the pinion shaft 7. These upper and lower shafts 3a and 3b are joined to each other rotatably relative to each other on the same axis line via a torsion bar 12.

A torque sensor 13 that detects a steering torque based on a relative rotation displacement amount between the upper and lower shafts 3a and 3b via the torsion bar 12 is provided. A torque detection result by the torque sensor 13 is given to an ECU (Electronic Control Unit) 14. Based on the torque detection result and a vehicle speed detection result given from the vehicle speed sensor 15, the ECU 14 controls driving of first and second electric motors 161 and 162 as an actuator for generating a steering force (in the present embodiment, a steering assist force).

Output rotations of the first and second electric motors 161 and 162 are decelerated via a first speed reduction mechanism 17 and a second speed reduction mechanism 18 as power transmission devices and transmitted to the pinion shaft 7, and converted into a linear movement of the rack bar 8, and accordingly, steering is assisted.

A sub-assembly SA as a single unit including the first and second electric motors 161 and 162, the first speed reduction mechanism 17, and a housing 19 for housing the first and second electric motors 161 and 162 and the first speed reduction mechanism 17 is configured.

The first speed reduction mechanism 17 includes drive gears 211 and 212 as drive members joined to rotary shafts 20 of the electric motors 161 and 162 rotatably integrally, respectively, and a driven gear 22 as a driven member that engages with the drive gears 211 and 212.

The second speed reduction mechanism 18 includes a worm shaft 23 that is driven to rotate by the first and second electric motors 161 and 162 via the first speed reduction mechanism 17, and a worm wheel 24 that engages with the worm shaft 23 and is joined to the lower shaft 3b of the steering shaft 3 rotatably integrally. Specifically, the second speed reduction mechanism 18 consists of a worm gear mechanism.

Figure 2:
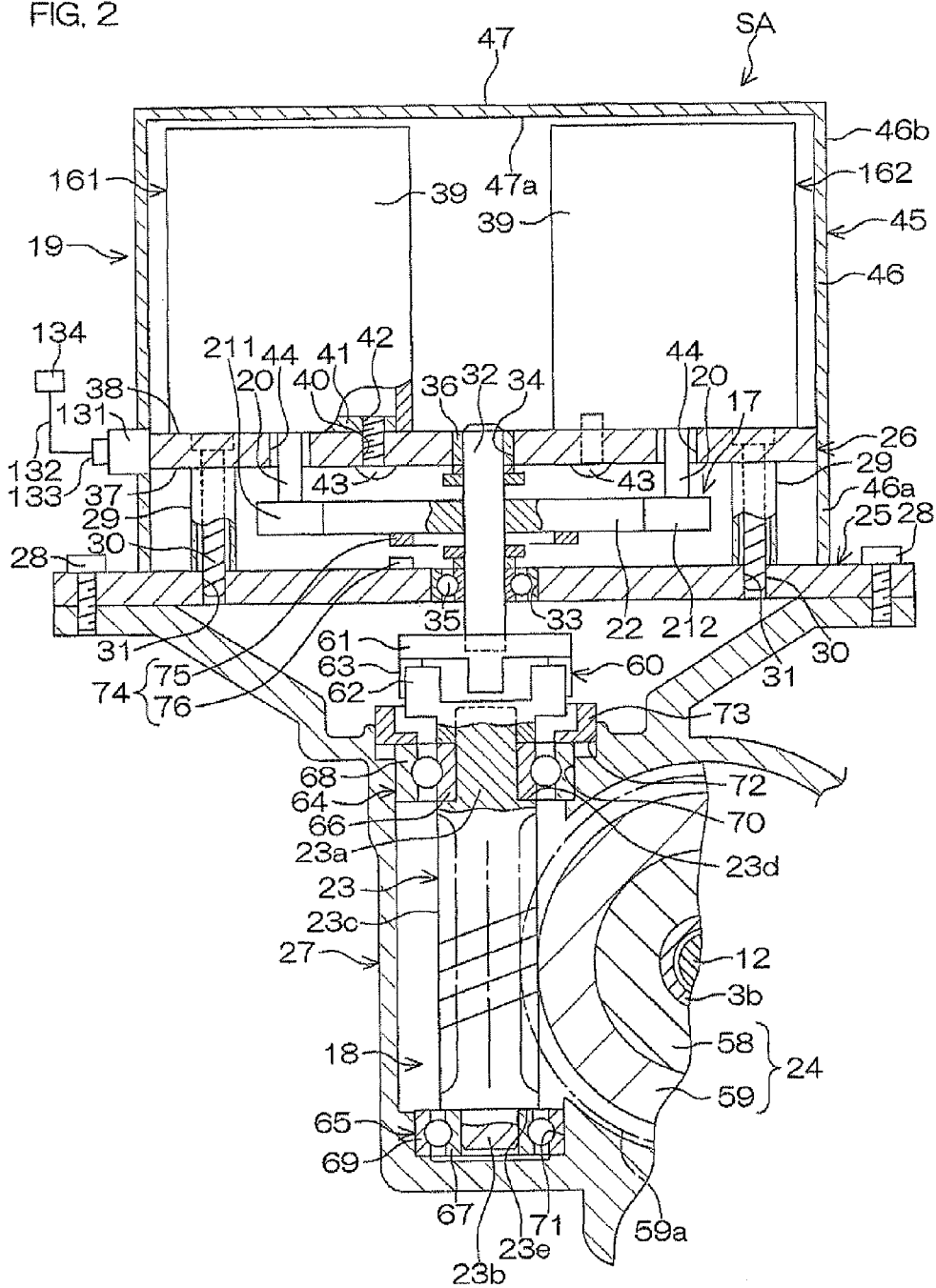
FIG. 2 is a sectional view of an essential portion of the electric power steering device.

Referring to FIG. 2, the sub-assembly SA includes a base plate 25 as first support plate and a motor fixing plate 26 as a second support plate which face to each other at a predetermined distance. The base plate 25 is fastened to a gear housing 27 that houses the second speed reduction mechanism 18 by using, for example, a fixation screw.

Between the base plate 25 and the motor fixing plate 26, a plurality of cylindrical spacers 29 for restricting the distance between the base plate 25 and the motor fixing plate 26 are disposed. By using fixation screws 30 inserted through the spacer 29, the base plate 25 and the motor fixing plate 26 are fixed to each other. For example, by screwing the fixation screws 30 inserted through screw insertion holes of the motor fixing plate 26 into screw holes 31 formed in the base plate 25, a spacer 29 is sandwiched between the base plate 25 and the motor fixing plate 26, and as a result, the base plate 25 and the motor fixing plate 26 are fixed to each other.

A pivot 32 that rotates integrally with the driven gear 22 of the first speed reduction mechanism 17 is provided. On the other hand, in the base plate 25 and the motor fixing plate 26, first and second support holes 33 and 34 are formed on the same axis line. The pivot 32 of the driven gear 22 is supported rotatably by a first bearing 35 retained in the first support hole 33, and supported rotatably via a second bearing 36 retained in the second support hole 34.

The motor fixing plate 26 has a first surface 37 facing to the base plate 25 and a second surface 38 on the opposite side of the first surface 37. To the second surface 38 of the motor fixing plate 26, motor housings 39 of the electric motors 161 and 162 are fixed.

In detail, the motor housings 39 are fixed to the motor fixing plate 26 by using fixation screws 43 screwed into screw holes 42 of end walls 41 of the motor housings 39 through screw insertion holes 40 of the motor fixing plate 26 from the first surface 37 side of the motor fixing plate 26.

To the outer peripheral portion of the motor fixing plate 26, an external coupler 131 for supplying electric power to the first and second electric motors 161 and 162 from the outside is attached. To the external coupler 13, a coupler 133 provided on one end of a power cable 132 as external wiring is connected. The other end of the power cable 132 is connected to a power supply 134 as an electric element.

From the end walls 41 of the motor housings 39 of the electric motors 161 and 162, the rotary shafts 20 project, and the rotary shafts 20 are inserted through insertion holes 44 formed in the motor fixing plate 26 and extend between the base plate 25 and the motor fixing plate 26. The drive gears 211 and 212 attached to end portions of the rotary shafts 20 of the electric motors 161 and 162 engage with a common driven gear 22.

Figure 3:
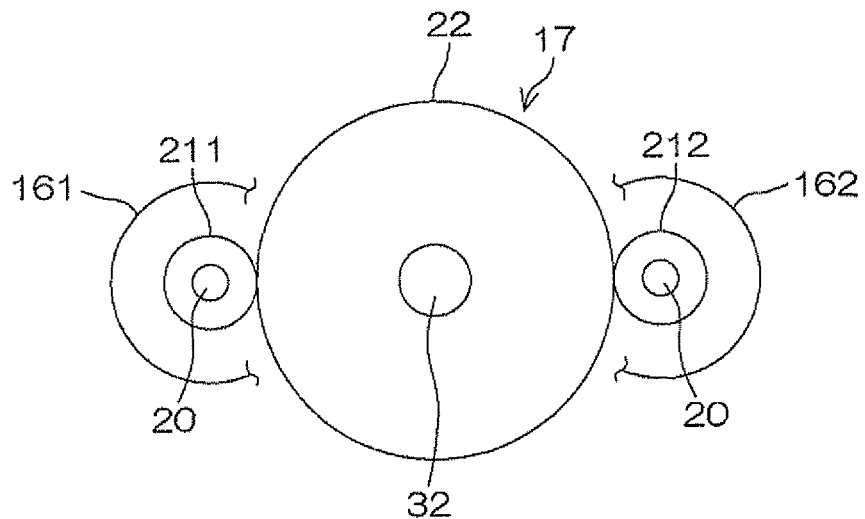
FIG. 3 is a general view showing a layout of electric motors and a first speed reduction mechanism.

As shown in FIG. 3, the drive gears 211 and 212 attached to the rotary shafts 20 of the first and second electric motors 161 and 162 are disposed at positions facing to each other across the driven gear 22.

Referring to FIG. 2, the housing 19 that houses the first and second electric motors 161 and 162 and the first speed reduction mechanism 17 is formed by combining the base plate 25 and a cylindrical cover housing 45. Inside the housing 19, a housing space is partitioned. The cover housing 45 includes a cylindrical portion 46 having one end 46a opened and surrounding the periphery of the motor fixing plate 26, and an end wall 47 closing the other end 46b of the cylindrical portion 46.

Figure 4:
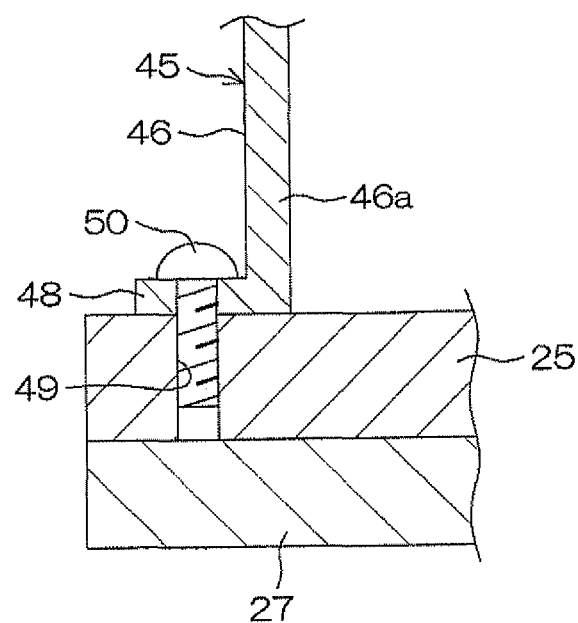
FIG. 4 is a sectional view of an essential portion of a housing of a sub-assembly of the electric power steering device.

As shown in FIG. 4, an attaching flange 48 extending to the radially outer side from a part in the circumferential direction of one end 46a of the cylindrical portion 46 of the cover housing 45 is provided. By using a fixation screw 50 inserted through the attaching flange 48 and screwed into a screw hole 49 of the base plate 25, the cover housing 45 is fixed to the base plate 25.

Figure 5:
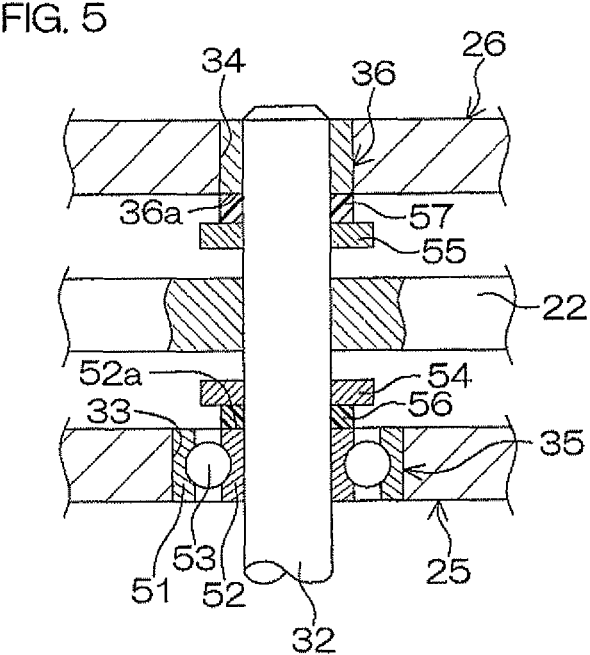
FIG. 5 is a sectional view of a support structure of a driven gear.

Referring to FIG. 5, the pivot 32 is provided rotatably integrally and movably integrally in the axial direction with the driven gear 22. The pivot 32 is supported in a floating manner in the axial direction. In detail, the first bearing 35 consists of a ball bearing including an outer race 51 press-fitted into the first support hole 33 of the base plate 25, an inner race 52 to which the pivot 32 is loosely fitted, and a roller 53 interposed between the outer race 51 and the inner race 52.

The second bearing 36 consists of a slide bearing such as a slide metal, etc., press-fitted and retained in the second support hole 34 of the motor fixing plate 26. However, a rolling bearing such as a ball bearing may be used as the second bearing 36.

To the outer periphery of the pivot 32, annular first and second pressing plates 54 and 54 movable integrally in the axial direction of the pivot 32 are attached. The first pressing plate 54 is disposed between the first bearing 35 and the driven gear 22. Between the end face 52a of the inner race 52 of the first bearing 35 and the first pressing plate 54, an annular resilient member 56 made of, for example, rubber is interposed in a compressed state.

The second pressing plate 55 is disposed between the second bearing 36 and the driven gear 22. Between the end face 36a of the second bearing 36 and the second pressing plate 55, an annular resilient member 57 is interposed in a compressed state. The pivot 32 is resiliently supported at both sides in the axial direction by both of the resilient members 56 and 57.

Therefore, a thrust force to be applied to the driven gear 22 can be resiliently received by the resilient members 56 and 57. Therefore, deterioration in the transmission efficiency of the drive gears 211 and 212 and the driven gear 22 due to the thrust force can be suppressed, and vibration between the pivot 32 and the base plate and motor fixing plate 26 due to the thrust force can be suppressed.

Specifically, a plurality of small-sized electric motors 161 and 162 are used, and the speed reduction ratio of the first speed reduction mechanism 17 is set to a high speed reduction ratio, so that in the case of high-speed rotation according to rapid steering, due to variation in assembly accuracy of the components, a high thrust force may be generated in a direction parallel to the rotary shafts 20 of the electric motors 161 and 162. If in the electric motors 161 and 162, the rotary shafts 20 are supported by ball bearings, the number of components may increase and noise may occur. On the other hand, in the present embodiment, the thrust force can be absorbed by the resilient members 56 and 57. Accordingly, deterioration in the transmission efficiency can be suppressed, and vibration between the pivot 32 and the base plate 25 and the motor fixing plate 26 can be suppressed.

Referring to FIG. 2 again, the worm shaft 23 is disposed coaxially with the pivot 32 of the driven gear 22 as an output shaft of the first speed reduction mechanism 17. The worm shaft 23 has first and second end portions 23a and 23b spaced in the axis longitudinal direction, and a worm 23c as a toothed portion on an intermediate portion between the first and second end portions 23a and 23b.

The worm wheel 24 is joined to an axially intermediate portion of the lower shaft 3b of the steering shaft 3 rotatably integrally and immovably in the axial direction. The worm wheel 24 includes an annular core metal 58 coupled rotatably integrally to the lower shaft 3b, and a synthetic resin member 59 surrounding the periphery of the core metal 58 and forming a toothed portion 59a on the outer periphery. The core metal 58 is inserted into a mold when resin-molding, for example, the synthetic resin member 59.

As an output shaft of the first speed reduction mechanism 17, the pivot 32 of the driven gear 22 and the worm shaft 23 are disposed coaxially. The pivot 32 and the worm shaft 23 are joined coaxially to each other via a joint 60 interposed therebetween in a power transmittable manner. The joint 60 includes an annular input member 61 that rotates integrally with the pivot 32, an annular output member 62 that rotates integrally with the worm shaft 23, and an annular resilient member 63 that is interposed between the input member 61 and the output member 62 and joins the input member 61 and the output member 62 in a power transmittable manner.

The first and second end portions 23a and 23b of the worm shaft 23 are supported rotatably on the gear housing 27 via the corresponding third and fourth bearings 64 and 65. The third and fourth bearings 64 and 65 consist of, for example, ball bearings.

Inner races 66 and 67 of the third and fourth bearings 64 and 65 are fitted to the first and second end portions 23a and 23b of the worm shaft 23 rotatably integrally, respectively. The inner races 66 and 67 are in contact with corresponding positioning stepped portions 23d and 23e directed opposite to each other of the worm shaft 23, respectively. Outer races 68 and 69 of the third and fourth bearings 64 and 65 are retained in corresponding bearing retaining holes 70 and 71 of the gear housing 27.

An annular fixing member 73 is screwed into a threaded portion 72 adjacent to the bearing retaining hole 70, and the fixing member 73 presses an end face of the outer race 68 of the third bearing 64. The pressing force of the fixing member 73 is received by the bottom portion of the bearing retaining hole 71 via the inner race 66 of the third bearing 64, the positioning stepped portions 23d and 23e of the worm shaft 23, and the inner race 67 and the outer race 69 of the fourth bearing 65. Accordingly, preload is applied to the third bearing 64 and the fourth bearing 65.

The sub-assembly SA includes a rotation angle sensor 74 as a rotation angle detection device that detects a rotation angle of the driven gear 22. The rotation angle sensor 74 includes, for example, an annular movable portion 75 attached rotatably integrally to an end face of the driven gear 22, and a fixed portion 76 fixed to the base plate 25 so as to face to the movable portion 75. On the fixed portion 76, a detection section for detecting a rotative displacement of the movable portion 75 is provided. An output signal of the rotation angle sensor 74 is supplied to the ECU 14.

The rotation angle of the driven gear 22 has a fixed correlation based on a gear ratio of the drive gears 211 and 212 and the driven gear 22 with the rotation angle of the rotary shaft 20 of each of the electric motors 161 and 162. Therefore, in the ECU 14, based on the rotation angle of the driven gear 22 detected by the rotation angle sensor 74 and the gear ratio, the rotation angles of the rotary shafts 20 of the electric motors 161 and 162 are computed. Therefore, in each of the electric motors 161 and 162, it is not necessary to provide a rotation angle sensor such as a resolver that is usually provided, so that the structure can be simplified.

For detection of the rotation angles of the electric motors 161 and 162, an output of the rotation angle sensor 74 that detects the rotation angle of the driven gear 22 is used, so that at a stage previous to speed reduction by the second speed reduction mechanism 18, the rotation angles are detected, and for example, when this vehicle steering apparatus 1 is applied to a parking assistance system, the steering angle can be accurately controlled when assisting parking.

Figure 6:
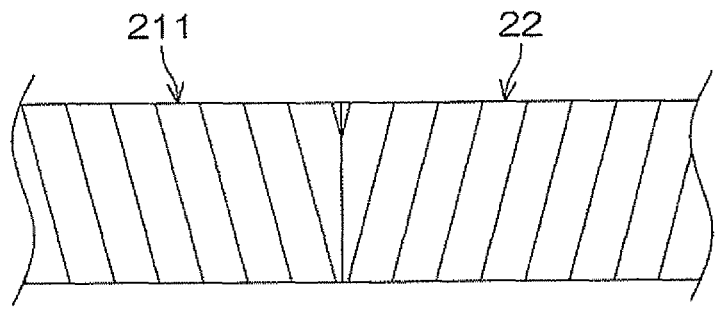
FIG. 6 is a general view of a drive gear and a driven gear.

The drive gear 211 and the drive gear 212 have the same configuration, so that the description is given by using the drive gear 211. As shown in FIG. 6, the drive gear 211 and the driven gear 22 consist of helical gears that engage with each other. The drive gear 212 also consists of a helical gear although this is not shown.

Referring to FIG. 7, in an engagement region E as a power transmission region between the drive gear 211 and the driven gear 22, an annular first resilient body 111 and an annular second resilient body 112 as a plurality of resilient bodies with resilient forces different from each other are interposed in a compressed state between the drive gear 211 and the driven gear 22.

In the present embodiment, in order to make different the resilient forces of the first and second resilient bodies 111 and 112, the materials of the first and second resilient bodies 111 and 112 are different from each other. For example, relatively soft rubber may be used as the first resilient body 111, and relatively hard rubber may be used as the second resilient body 112.

The first resilient body 111 partially projects from the tooth bottoms 114 of teeth 113 of the drive gear 211. The second resilient body 112 partially projects from the tooth bottoms 124 of teeth 123 of the driven gear 22. In the engagement region. E, the first resilient body 111 resiliently presses the tooth tip 125 of the driven gear 22. In the engagement region E, the second resilient body 112 resiliently presses the tooth tip 115 of the drive gear 211.

Figure 8A:
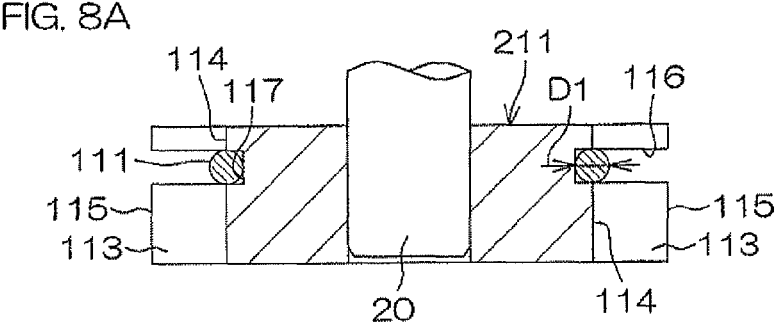
FIG. 8A is a sectional view of the drive gear.

In detail, as shown in FIG. 8A, on the outer periphery of the drive gear 211, a first annular groove 116 for accommodating the first resilient body 111 is formed. The groove bottom 117 of the first annular groove 116 is deeper than the tooth bottom 114 of the drive gear 211. The first resilient body 111 is fitted to the groove bottom 117 of the first annular groove 116 while a tightening allowance is left.

Figure 8B:
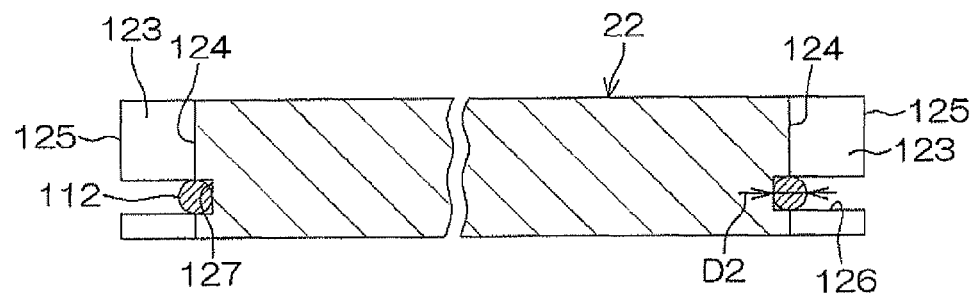
FIG. 8B is a sectional view of the driven gear.

As shown in FIG. 8B, on the outer periphery of the driven gear 22, a second annular groove 126 for accommodating the second resilient body 112 is formed. The groove bottom 127 of the second annular groove 126 is deeper than the tooth bottom 124 of the driven gear 22. The second resilient body 112 is fitted to the groove bottom 127 of the second annular groove 126 while a tightening allowance is left.

Figure 9:
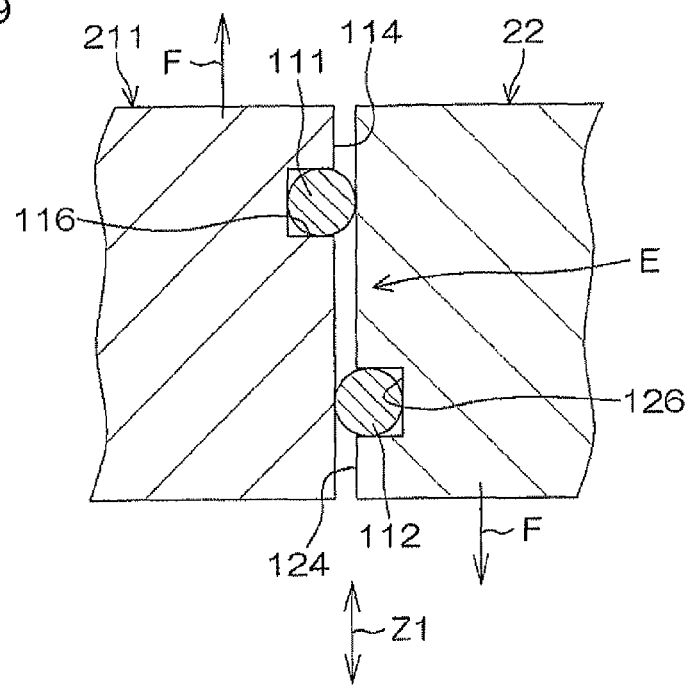
FIG. 9 is a sectional view of the engagement region of the drive gear and the driven gear.

Referring to FIG. 9 showing a section of the engagement region E, the first annular groove 116 of the drive gear 211 and the second annular groove 126 of the driven gear 22 are disposed at positions off set from each other in a direction Z1 parallel to the axial direction of the drive gear 211 and the driven gear 22.

The electrical connection from the above-described external coupler 131 for power supply to the first and second electric motors 161 and 162 is realized by the connection member 130 shown in FIG. 10. In detail, the connection member 130 includes first terminals 135 and second terminals 136 which are connected to each other according to an operation (operation shown by the arrows in FIG. 10) of joining the first and second electric motors 161 and 162 to the motor fixing plate 26 that is a part of the housing 19.

Either the first terminals 135 or the second terminals 136 consist of male terminals, and the other terminals consist of female terminals. In the present embodiment, description is given by assuming a case where the first terminals 135 are male terminals. The first terminals 135 project in parallel to the rotary shafts 20 from the motor housings 39 of the electric motors 161 and 162.

On the other hand, the second terminals 136 are provided on the internal couplers 137 fixed to the motor fixing plate 26. Specifically, the internal coupler 137 includes a coupler housing 138 fixed to the motor fixing plate 26 and the second terminal 136.

As shown in FIG. 2, in a state where the housing 19 of the sub-assembly SA is fitted, the first and second electric motors 161 and 162 and the motor fixing plate 26 are disposed inside the housing 19, so that the first terminals 135 and the second terminals 136 fixed to each other are disposed inside the housing 19 as shown by the alternate long and two short dashed lines in FIG. 10.

On the other hand, the external coupler 131 includes a coupler housing 139 fixed to the outer peripheral portion of the motor fixing plate 26 and third terminals 140 retained in the coupler housing 139. The second terminals 136 of the internal couplers 137 and the third terminals 140 of the external couplers 131 are connected to each other via conductive members 141 and 142 provided on the motor fixing plate 26.

As the conductive members 141 and 142, for example, flexible printed boards called FPCs (flexible printed circuits) may be used. When FPCs are used, the FPCs are preferably disposed along the surface of the motor fixing plate 26.

According to the present embodiment, the first and second electric motors 161 and 162, the first speed reduction mechanism 17, and the housing 19 that houses these, etc., are unitized as a sub-assembly SA. Therefore, for example, by making the electric motors 161 and 162 common to each other and changing the speed reduction ratio of the first speed reduction mechanism 17, the specifications of the unit can be easily changed. Accordingly, the unit can be easily applied to vehicle steering apparatuses 1 with various characteristics.

By making the electric motors the manufacturing cost of which is high common to each other, the total cost when manufacturing various units can be reduced. The electric motors can be downsized, so that the weight of the entire sub-assembly SA can be reduced, and eventually, the weight of the entire vehicle steering apparatus 1 can be reduced.

In particular, by combining the small-sized and high-revolution type electric motors 161 and 162 and the first speed reduction mechanism 17 with a high speed reduction ratio, a high output can be obtained even by the small-sized device. Further, the plurality of electric motors 161 and 162 and the first speed reduction mechanism 17, etc., can be assembled in advance as a sub-assembly SA, so that the assembly performance is high.

The first speed reduction mechanism 17 includes the drive gears 211 and 212 and the driven gear 22, and the rotary shafts 20 of the electric motors 161 and 162 are parallel to the pivot 32 of the driven gear 22, so that the following advantages are obtained. That is, in the axial direction of the rotary shafts 20 of the electric motors 161 and 162, the drive gears 211 and 212 and the driven gear 22 can be disposed at the same position, so that in the axial direction of the rotary shafts 20, the sub-assembly SA can be downsized, and eventually, the vehicle steering apparatus 1 can be downsized.

The power transmission method of the first speed reduction mechanism 17 is a gear transmission using the drive gears 211 and 212 and the driven gear 22 to be engaged with each other, so that power transmission is reliable. As the drive gears 211 and 212 and the driven gear 22, helical gears that engage with each other are used. When helical gears are used, the contact ratio of teeth can be increased, and this is preferable for transmitting a high output.

As an actuator for generating a steering force, the plurality of electric motors 161 and 162 are provided, and the plurality of drive gears 211 and 212 of the first speed reduction mechanism 17 are connected to the rotary shafts 20 of the corresponding electric motors 161 and 162, respectively, and are joined to the driven gear 22 in a power transmittable manner. Therefore, the following advantages are obtained. That is, the plurality of electric motors 161 and 162 can be disposed side by side, and the drive gears 211 and 212 connected to the rotary shafts 20 of the corresponding electric motors 161 and 162 and the driven gear 22 can be disposed at the same position in the axial direction of the rotary shafts 20. Therefore, in the axial direction of the rotary shafts 20 of the electric motors 161 and 162, the sub-assembly SA can be further downsized, and eventually, the vehicle steering apparatus 1 can be further downsized.

A rotation angle of the driven gear 22 that rotates in conjunction with the rotary shafts 20 of the electric motors 161 and 162 is detected, so that a conventionally-used rotation angle detection device inside the electric motor can be omitted.

Further, in the present embodiment, the rotation angle sensors to be installed in the electric motors 161 and 162 can be omitted, the rotation angle sensor 74 that detects a rotation angle of the driven gear 22 is provided, however, instead of these, a rotation angle sensor that detects a rotation angle of either one of the drive gears 211 and 212 can be provided.

When the plurality of electric motors 161 and 162 are used, detection of rotation angles of the electric motors 161 and 162 can be replaced by detection of a rotation angle of either one of the electric motors 161 and 162, either one of the drive gears 211 and 212, or the driven gear 22. Therefore, the structure can be greatly simplified.

In the engagement region E between the drive gear 211 (212) and the driven gear 22, first and second resilient bodies 111 and 112 with different resilient forces are interposed between the drive gear 211 (212) and the driven gear 22, so that the first and second resilient bodies 111 and 112 show buffering characteristics (for example, frequency characteristics) different from each other. Therefore, vibration and noise of the first speed reduction mechanism 17 can be suppressed.

Moreover, the drive gear 211 (212) and the driven gear 22 are helical gears, so that the following advantages can be obtained. That is, between the helical gears, teeth engage with each other obliquely in the axial direction of the gear and transmit power. In the engagement region E as a power transmission region, between the drive gear 211 (212) and the driven gear 22, first and second resilient bodies 111 and 112 with different resilient forces are interposed, so that thrust forces can be applied to the drive gear 211 (212) and the driven gear 22 as shown in FIG. 9. Therefore, the first and second resilient bodies 111 and 112 suppress not only engagement noise when the teeth 113 and 123 engage with each other but also vibration in the axial direction of the drive gear 211 (212) and the driven gear 22. As a result, a high noise prevention effect can be obtained.

Further, the first resilient body 111 is retained in the first annular groove 116 formed on the drive gear 211 (212), and the second resilient body 112 is retained in the second annular groove 126 formed on the driven gear 22, so that the following advantages are obtained. That is, the structure of the first speed reduction mechanism 17 is prevented from becoming complicated or larger in size, and the first and second resilient bodies 111 and 112 can be retained on the drive gear 211 (212) and the driven gear 22, respectively. As the first and second resilient bodies 111 and 112, for example, general-purpose O-rings can be used, so that the manufacturing cost can be reduced.

Further, the first annular groove 116 and the second annular groove 126 are disposed at positions offset from each other in the direction Z1 parallel to the axial direction of the drive gear 211 (212) and the driven gear 22, so that the resilient body 111 or 112 retained on one of the drive gear 211 (212) and the driven gear 22 reliably resiliently energizes the other, so that the thrust forces F can be stably obtained.

Simultaneously with joining of the electric motors 161 and 162 to the motor fixing plate 26 that is a part of the housing 19 for assembly, the first and second terminals 135 and 136 of the connection member 130 for electrical connection of the electric motors 161 and 162 to the outside can be connected to each other, so that the assembly operation becomes very easy.

In particular, the first terminals 135 provided on the electric motors 161 and 162 are connected to the second terminals 136 of the internal couplers 137 fixed to the motor fixing plate 26, so that the connecting operation can be simplified.

The connection member 130 includes an external coupler 131 exposed to the outside of the housing 19, and the third terminals 140 provided on the external coupler 131 are connected to the second terminals 136 provided on the internal couplers 137, so that power can be easily supplied to the electric motors 161 and 162 inside the housing 19 by using the external coupler 131.

Figure 11A:
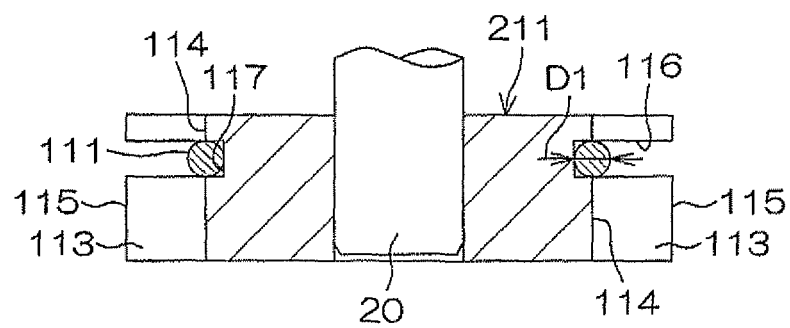
FIG. 11A is a sectional view of a drive gear of another embodiment of the present invention.
Figure 11B:
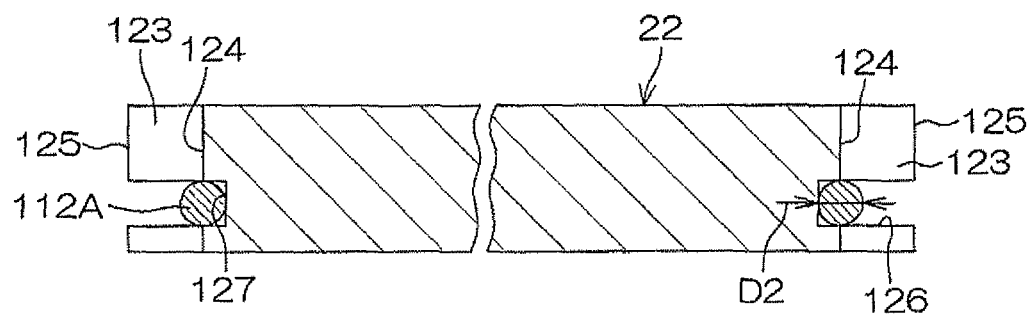
FIG. 11B is a sectional view of a driven gear that engages with the drive gear of FIG. 11A.

In the embodiment of FIG. 8A and FIG. 8B, in order to make different the resilient forces of the first resilient body 111 and the second resilient body 112, different materials are used for the first resilient body 111 and the second resilient body 112, however, instead of this or in addition to this, as shown in FIG. 11A and FIG. 11B, the section diameter D2 of the second resilient body 112A may be made larger or smaller than the section diameter D1 of the first resilient body 111. In this case, the same operation and effect as in the embodiment of FIG. 8A and FIG. 8B can be obtained.

Figure 12:
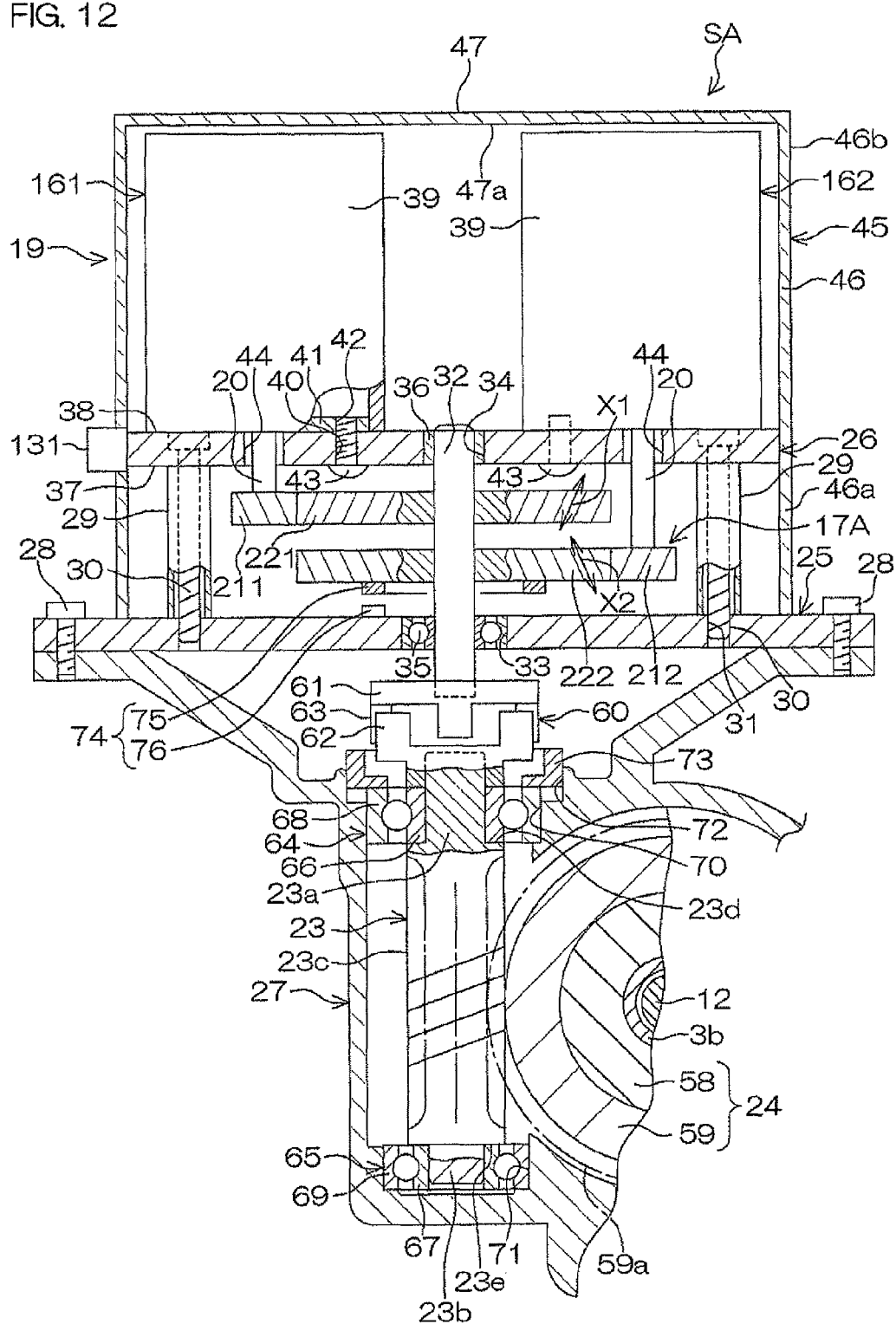
FIG. 12 is a sectional view of an essential portion of an electric power steering device as a vehicle steering apparatus of another embodiment of the present invention, showing an example using two driven gears.

Next, FIG. 12 shows another embodiment of the present invention. Referring to FIG. 12, the present embodiment is different from the embodiment of FIG. 2 mainly in that, while the drive gears 211 and 212 joined to the rotary shafts 20 of the electric motors 161 and 162 engage with the common driven gear 22 in the first speed reduction mechanism 17 of the embodiment of FIG. 2, in the first speed reduction mechanism 17A of the embodiment of FIG. 12, a first driven gear 221 and a second driven gear 222 joined to the same axis of the pivot 32 are provided, and the first driven gear 221 engages with the drive gear 211, and the second driven gear 222 engages with the drive gear 212.

The first driven gear 221 and the second driven gear 222 are helical gears, and the tooth trace direction X1 of the driven gear 221 and the tooth trace direction X2 of the second driven gear 222 are different from each other. In detail, the tooth trace directions X1 and X2 are slanted opposite to each other with respect to the axial direction of the pivot 32.

In the present embodiment, the pressing plates 54 and 55 and the resilient members 56 and 57 provided in the embodiment of FIG. 5 are omitted. In the present embodiment, the same component as in the embodiment of FIG. 2 is designated by the same reference numeral.

According to the present embodiment, the axial components (thrust forces) of driving reaction forces that are applied to the first driven gear 221 and the second driven gear 222 act in directions opposite to each other and cancel each other. As a result, particularly when rotating at a high-speed, deterioration in the transmission efficiency of the first speed reduction mechanism 17A due to the thrust forces can be suppressed. That is, the transmission efficiency of the first speed reduction mechanism 17A can be improved.

When the plurality of electric motors 161 and 162 are combined, the gear engagement portions for speed reduction increase. Therefore, for suppressing noise and deterioration in transmission efficiency, high fitting accuracy between the gears is required, and as a result, the defective percentage of the product may increase. On the other hand, when the combination of helical gears is used, an effect of suppressing the thrust forces can be expected as described above, so that it is not necessary to excessively increase the fitting accuracy.

Figure 13A:
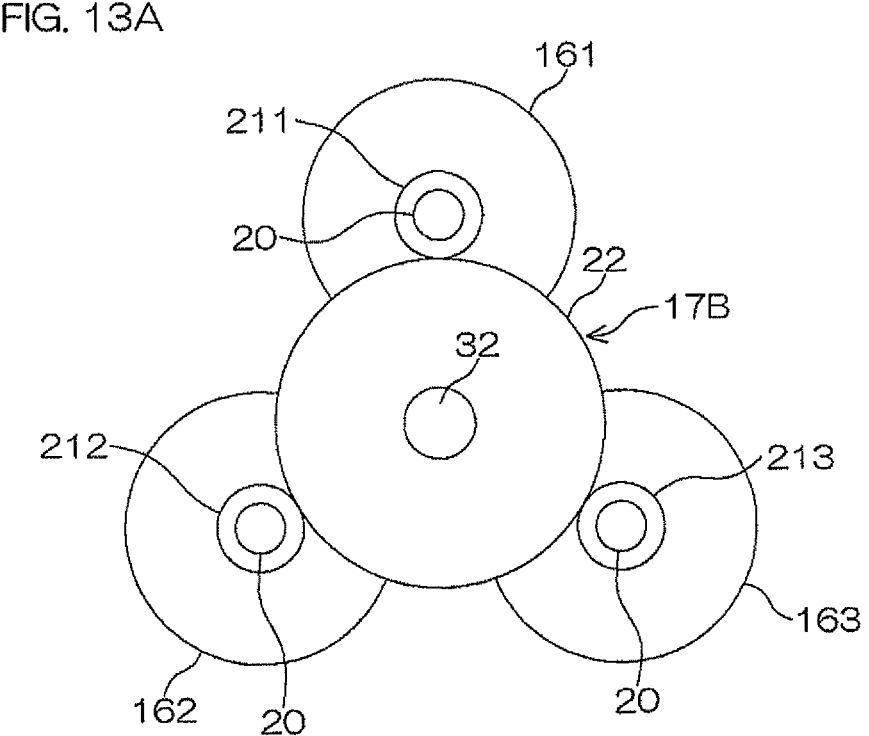
FIG. 13A is a general view of a first speed reduction mechanism and electric motors of still another embodiment of the present invention, showing an example using three electric motors.
Figure 13B:
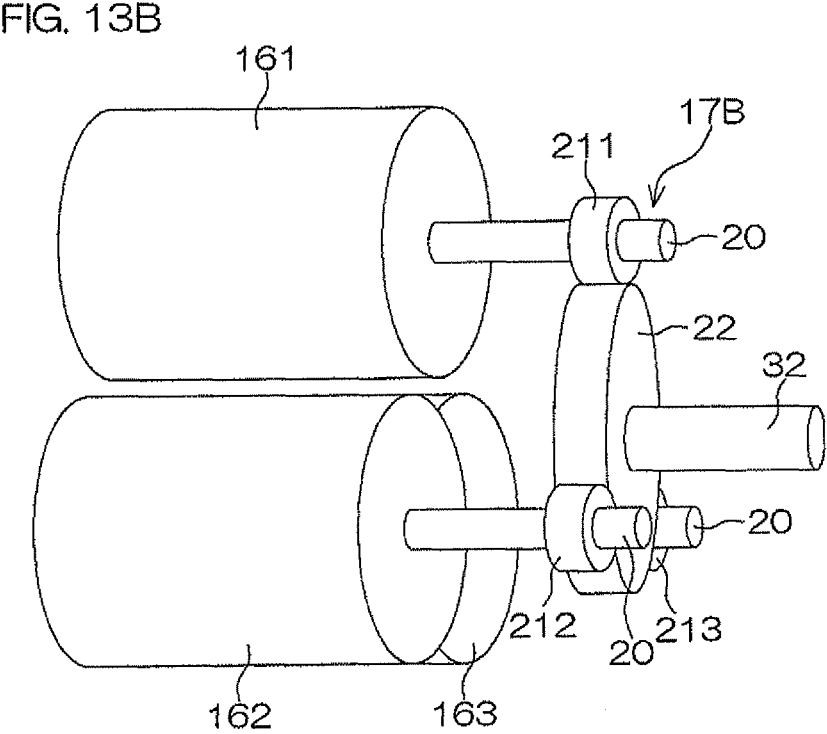
FIG. 13B is a perspective view of the first speed reduction mechanism and the electric motors of FIG. 13A.

In the embodiment of FIG. 2, two electric motors 161 and 162 are used as an actuator, however, the present invention is not limited to this. For example, as shown in the first speed reduction mechanism 17B of FIG. 13A and FIG. 13B, first, second and third electric motors 161, 162, and 163 may be used. In this case, drive gears 211, 212, and 213 joined to rotary shafts 20 of the electric motors 161 to 163 are also disposed at even intervals in the circumferential direction of the driven gear 22.

In the case where three electric motors 161 to 163 are provided, when an abnormality (that is, failure) occurs in any one of the three electric motors 161 to 163, it is preferable that necessary steering is secured by using the other two normal electric motors.

In detail, as shown in mode 1 of Table 1 shown below, in some cases of normal operation, the first electric motor 161 is used for leftward and rightward steering, and the remaining second electric motor 162 is used for only rightward steering and third electric motor 163 is used for only leftward steering. In this case, two electric motors are used for each of leftward steering and rightward steering, so that a sufficient output for each steering can be obtained.

When any one of the first, second, and third electric motors 161 to 163 fails, it is also possible that the modes 2 and 3 shown in Table 1 are alternatively executed, modes 4 and 5 are alternatively executed, or modes 6 and 7 are alternatively executed.

TABLE 1

| Operating state | | Control mode | Electric motor | | |
|---|---|---|---|---|---|
| | | | 161 | 162 | 163 |
| Normal operation | | Mode 1 | Leftward/rightward | Rightward | Leftward |
| Abnormal operation | First electric motor 161 abnormal | Mode 2 | Stop | Rightward | Leftward |
| | | Mode 3 | Stop | Leftward/rightward | Leftward/rightward |
| | Second electric motor 162 abnormal | Mode 4 | Leftward/rightward | Stop | Leftward |
| | | Mode 5 | Leftward/rightward | Stop | Leftward/rightward |
| | Third electric motor 163 | Mode 6 | Leftward/rightward | Rightward | Stop |
| | | Mode 7 | Leftward/rightward | Leftward/rightward | Stop |

TABLE 1-continued

| Operating state | Control mode | Electric motor 161 | 162 | 163 |
|---|---|---|---|---|
| abnormal | | | | |

Referring to Table 1, when the first electric motor 161 used for leftward/rightward steering fails, control of mode 2 may be performed, or instead of mode 2, control of mode 3 may be performed.

In mode 2, drive control of the first electric motor 161 is stopped, and the second and third electric motors 162 and 163 functioning normally are made to contribute to rightward steering and leftward steering as in a normal state. However, in the case of failure, the output for steering becomes half the normal output.

In mode 3, drive control of the first electric motor 161 is stopped, and the drive control of the second and third electric motors 162 and 163 is switched so that both of the second and third electric motors 162 and 163 contribute to leftward steering and rightward steering.

Next, when the second electric motor 162 used for rightward steering fails, control of mode 4 may be performed, or instead of mode 4, control of mode 5 may be performed.

In mode 4, drive control of the second electric motor 162 is stopped, and the first electric motor 161 and the third electric motor 163 functioning normally are made to function in the same manner as in a normal state. Specifically, the first electric motor 161 is made to contribute to leftward steering and rightward steering. The third electric motor 163 is made to contribute to only leftward steering. However, in mode 4, in the case of failure, the output for rightward steering becomes half the normal output.

In mode 5, drive control of the second electric motor 162 is stopped, and the first electric motor 161 functioning normally is made to contribute to leftward steering and rightward steering in the same manner as in a normal state. In addition, drive control of the third electric motor 163 is switched so that the third electric motor 163 contributing to only leftward steering in a normal state contributes to both leftward steering and rightward steering.

Next, when the third electric motor 163 used for leftward steering fails, control of mode 6 may be performed, or instead of mode 6, control of mode 7 may be performed.

In mode 6, drive control of the third electric motor 163 is stopped, and the first electric motor 161 and the second electric motor 162 functioning normally are made to function in the same manner as in a normal state. Specifically, the first electric motor 161 is made to contribute to leftward steering and rightward steering. In addition, the second electric motor 162 is made to contribute to only rightward steering. However, in mode 6, in the case of failure, the output for leftward steering becomes half the normal output.

In mode 7, drive control of the third electric motor 163 is stopped, and the first electric motor 161 functioning normally is made to contribute to leftward steering and rightward steering in the same manner as in a normal state. In addition, drive control of the second electric motor 162 is switched so that the second electric motor 162 that contributes to only rightward steering in a normal state contributes to both leftward steering and rightward steering.

Figure 14A:
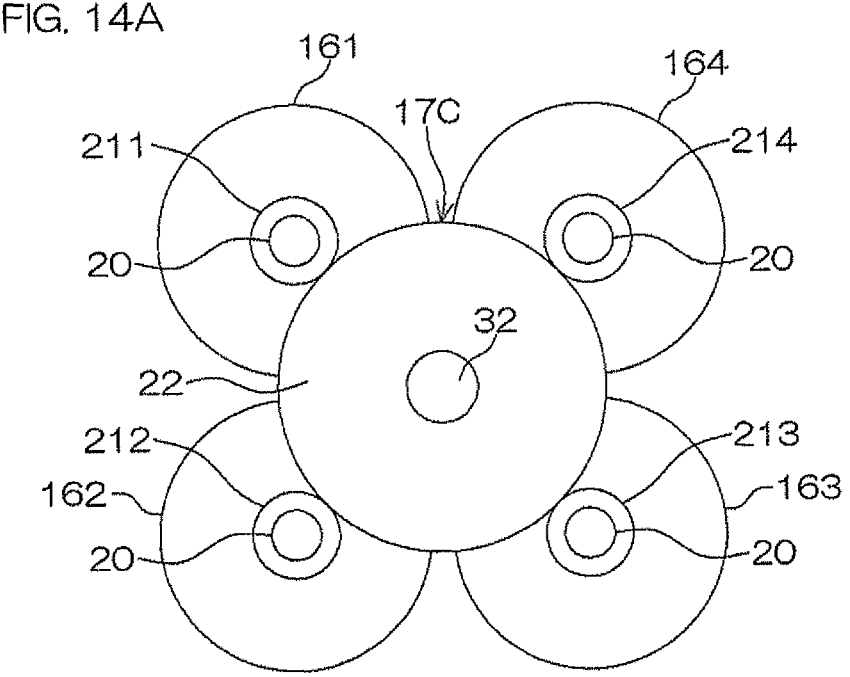
FIG. 14A is a general view of a first speed reduction mechanism and electric motors of still another embodiment of the present invention, showing an example using four electric motors.
Figure 14B:
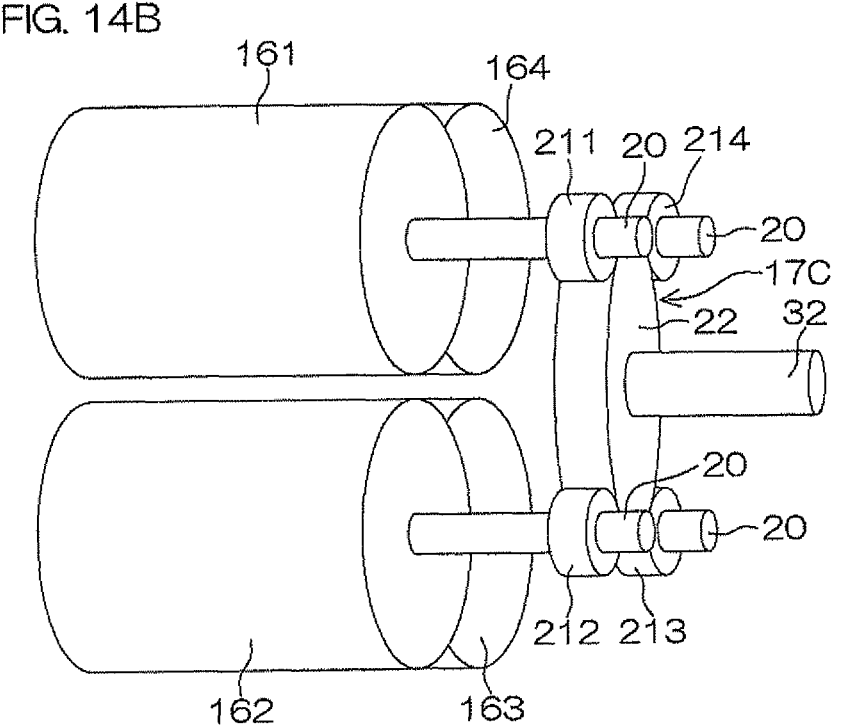
FIG. 14B is a perspective view of the first speed reduction mechanism and the electric motors of FIG. 14A.

As shown in FIG. 14A and FIG. 14B, four electric motors 161, 162, 163, and 164 may be used. In this case, the drive gears 211, 212, 213, and 214 joined to rotary shafts 20 of the electric motors 161, 162, 163, and 164 are also disposed at even intervals in the circumferential direction of the driven gear 22.

When four electric motors 161 to 164 are provided, as shown in mode 1 of Table 2 shown below, in some normal operation, the first and third electric motors 161 and 163 are used for only rightward steering, and the second and fourth electric motors 162 and 164 are used for only leftward steering. In this case, two electric motors are used for each of leftward steering and rightward steering, so that a sufficient output for each steering can be obtained.

TABLE 2

| Operating state | | Control mode | Electric motor 161 | 162 | 163 | 164 |
|---|---|---|---|---|---|---|
| Normal operation | | Mode 1 | Rightward | Leftward | Rightward | Leftward |
| Abnormal operation | One electric motor (for example, 161) abnormal | Mode 2 | Stop | Leftward | Rightward | Leftward |
| | | Mode 3 | Stop | Leftward/ rightward | Rightward | Leftward |
| | Two electric motors (for example, 161 and 162) abnormal | Mode 4 | Stop | Stop | Rightward | Leftward |
| | | Mode 5 | Stop | Stop | Leftward/ rightward | Leftward/ rightward |

When an abnormality occurs in any one of the four electric motors 161 to 164, it is preferable that necessary steering is secured by using the other three normal electric motors. For example, as shown in Table 2, when an abnormality occurs in the first electric motor 161, as shown in mode 2 of Table 2, drive control of the first electric motor 161 is stopped, and the second, third, and fourth electric motors 162, 163, and 164 are made to contribute to only leftward steering, only rightward steering, and only leftward steering, respectively, in the same manner as in a normal state. However, in this case of failure, the output for rightward steering becomes half the normal output.

Instead of mode 2 of Table 2, mode 3 of Table 2 may be performed. In mode 3 of Table 2, drive control of the first electric motor 161 is stopped. In addition, drive control of the second electric motor 162 is switched so that the second electric motor 162 that contributes to only leftward steering in a normal state contributes to leftward steering and rightward steering. Further, the third and fourth electric motors 163 and 164 are made to contribute to only rightward steering and only leftward steering, respectively, in the same manner as in a normal state.

On the other hand, when an abnormality occurs in any two electric motors of the four electric motors 161 to 164, it is preferable that necessary steering is secured by using the other two normal electric motors. For example, as shown in Table 2, when an abnormality occurs in the first and second electric motors 161 and 162, as shown in mode 4 of Table 2, drive control of the first and second electric motors 161 and 162 is stopped. In addition, the third and fourth electric motors 163 and 164 are made to contribute to only rightward steering and only leftward steering, respectively, in the same manner as in a normal state. However, the output for steering in this case of failure becomes half the normal output.

Instead of mode 4 of Table 2, mode 5 of Table 2 may be performed. In mode 5 of Table 2, drive control of the first and second electric motors 161 and 162 is stopped. In addition, drive control of the third and fourth electric motors 163 and 164 is switched so that the third and fourth electric motors 163 and 164 that contribute to only steering toward one side in a normal state contribute to both leftward steering and rightward steering. In this case, the same output for steering as in the normal state can be obtained even when failure occurs.

When the four electric motors 161 to 164 are provided, as shown in mode 1 of Table 3, in a normal operation, the first electric motor 161 is made to contribute to leftward steering and rightward steering, the second electric motor 162 is made to contribute to only rightward steering, and the third electric motor 163 is made to contribute to only leftward steering, and the fourth electric motor 164 is suspended. Specifically, the fourth electric motor 164 is made to stand-by in the case of failure.

When an abnormality occurs in the first electric motor 161, as shown in mode 2 of Table 3, drive control of the first electric motor 161 is stopped. In addition, the second and third electric motors 162 and 163 are made to contribute to only rightward steering and only leftward steering, respectively, in the same manner as in a normal state. Further, drive of the fourth electric motor 164 that is suspended normally is controlled so that the fourth electric motor 164 contributes to both leftward steering and rightward steering. In this case, the same output for steering as in a normal state can be obtained even in the case of failure.

When an abnormality occurs in the second electric motor 162, as shown in mode 3 of Table 3, drive control of the second electric motor 162 is stopped. In addition, the first electric motor 161 is made to contribute to leftward steering and rightward steering in the same manner as in a normal state. In addition, the third electric motor 163 is made to contribute to only leftward steering in the same manner as in a normal state. Further, drive of the fourth electric motor 164 is controlled so that the fourth electric motor 164 that is suspended normally contributes to rightward steering. In this case, the same output for steering as in a normal state can be obtained even in the case of failure.

When an abnormality occurs in the third electric motor 163, as shown in mode 4 of Table 3, drive control of the third electric motor 163 is stopped. In addition, the first electric motor 161 is made to contribute to leftward steering and rightward steering in the same manner as in a normal state. In addition, the second electric motor 163 is made to contribute to only rightward steering in the same manner as in a normal state. Further, drive of the fourth electric motor 164 is controlled so that the fourth electric motor 164 that is suspended normally contributes to leftward steering. In this case, the same output for steering as in a normal state can be obtained even in the case of failure.

Figure 15:
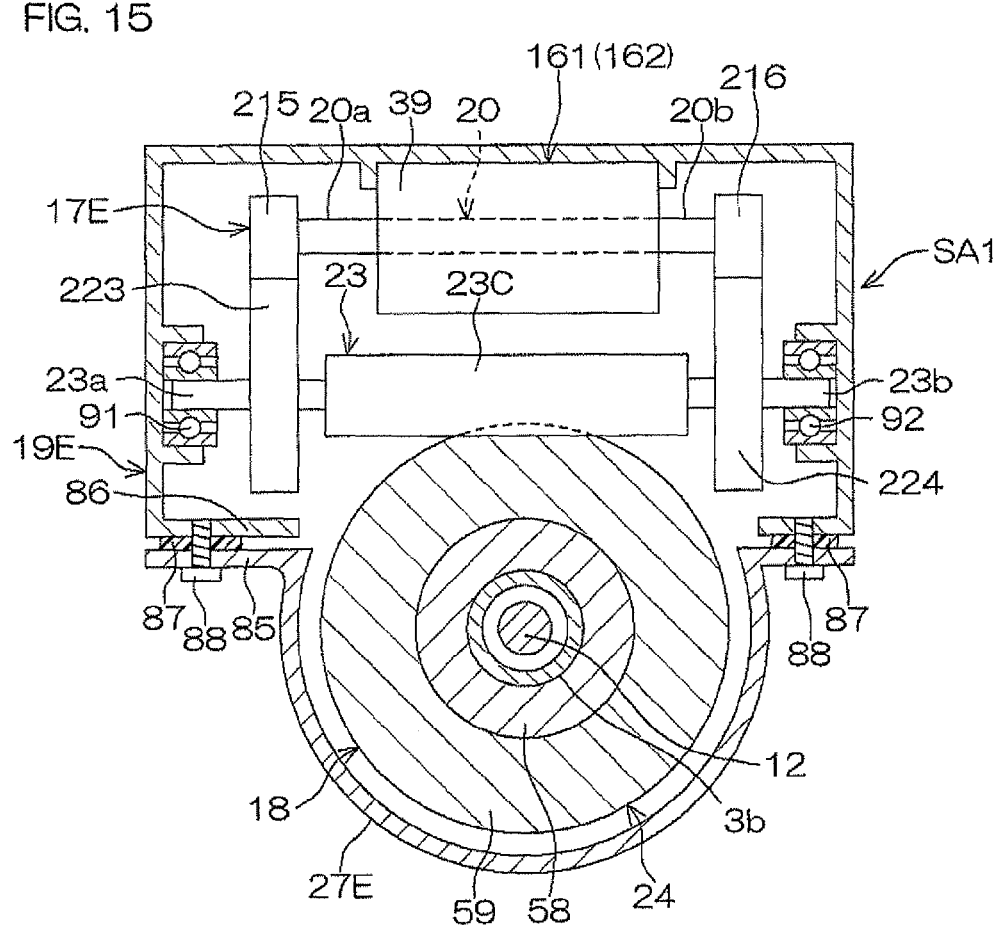
FIG. 15 is a general sectional view of an essential portion of an electric power steering device as a vehicle steering apparatus of still another embodiment of the present invention.
Figure 16:
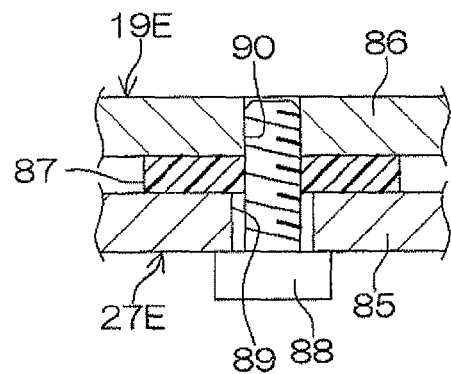
FIG. 16 is an enlarged view of the essential portion of the electric power steering device of FIG. 15.
Figure 17:
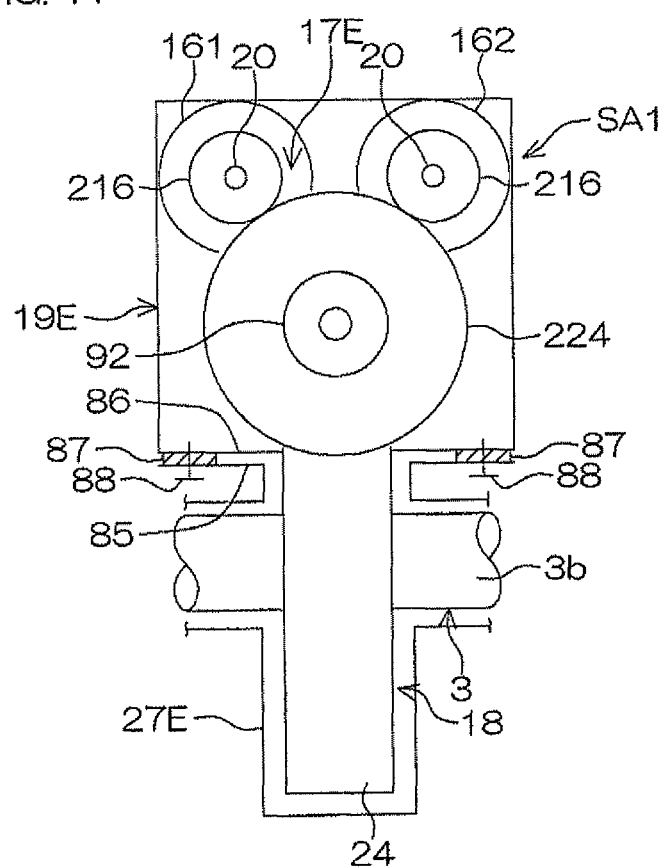
FIG. 17 is a schematic sectional view of the essential portion of the electric power steering device of FIG. 15 cut from a different angle.

Next, FIG. 15, FIG. 16, and FIG. 17 show still another embodiment of the present invention. As shown in FIG. 17, first and second electric motors 161 and 162 are provided as the plurality of electric motors, and as shown in FIG. 15, rotary shafts 20 of the electric motors 161 and 162 and a worm shaft 23 are disposed in parallel to each other, and between the rotary shafts 20 and the worm shaft 23, a first speed reduction mechanism 17E is disposed.

The first and second electric motors 161 and 162, the first speed reduction mechanism 17E, the worm shaft 23, a part of the worm wheel 24, and the housing 19E housing these constitute a sub-assembly SA1 as a single unit.

Motor housings 39 of the electric motors 161 and 162 are fixed to the housing 19E. A gear housing 27E housing the remaining portion of the worm wheel 24 and the housing 19E include facing plates 85 and 86 facing to each other. In a state where resilient bodies 87 such as rubber plates are interposed between these facing plates 85 and 86, the facing plates 85 and 86 are joined by screws 88 movably relative to each other in the axial direction of the screws 88. The housing 19E of the sub-assembly SA1 is resiliently supported by the gear housing 27E via the resilient bodies 87.

In detail, as the resilient body 87, a rubber material along the entire surfaces of the facing plates 85 and 86 may be used, or an annular resilient body that surrounds each screw 88 may be used. In this case, as the resilient body 87, for example, an annular rubber plate shown in FIG. 16 may be used, or an O-ring may be used. Alternatively, a spring washer may be used, or a complex washer formed by inserting a rubber material between two metal washers may be used.

The housing 19E and the housing 27E may be fastened by using a fastening band wound around the peripheries of the housings 19E and 27E.

As sown in FIG. 16, in a state where the annular resilient body 87 is sandwiched between the facing plate 85 of the gear housing 27E and the facing plate 86 of the housing 19E, the screw 88 inserted through the screw insertion hole 89 of the facing plate 85 is screwed into a screw hole 90 of the facing plate 86.

Referring to FIG. 15 again, the first and second end portions 23a and 23b of the worm shaft 23 are supported rotat-

TABLE 3

| | | Control | Electric motor | | | |
|---|---|---|---|---|---|---|
| Operating state | | mode | 161 | 162 | 163 | 164 |
| Normal operation | | Mode 1 | Leftward/rightward | Rightward | Leftward | Suspended |
| Abnormal operation | Electric motor 161 abnormal | Mode 2 | Stop | Rightward | Leftward | Leftward/rightward |
| | Electric motor 162 abnormal | Mode 3 | Leftward/rightward | Stop | Leftward | Rightward |
| | Electric motor 163 abnormal | Mode 4 | Leftward/rightward | Rightward | Stop | Leftward | ably by first and second bearings 91 and 92 retained on the housing 19E, respectively. Each of the electric motors 161 and 162 consists of so-called double-shaft motor, and one end 20a and the other end 20b of the rotary shaft 20 of each of the electric motors 161 and 162 project in directions opposite to each other from the motor housing 39.

Drive gears 215 joined rotatably integrally to one ends 20a of the rotary shafts 20 of the electric motors 161 and 162 are engaged with a driven gear 223 joined rotatably integrally to a first end portion 23a of the worm shaft 23. On the other hand, drive gears 216 joined rotatably integrally to the other ends 20b of the rotary shafts 20 of the electric motors 161 and 162 are engaged with a driven gear 224 joined rotatably integrally to a second end portion 23b of the worm shaft 23.

Specifically, the first speed reduction mechanism 17E is arranged to have two parallel transmission paths consisting of a set of two drive gears 215 and the driven gear 223 and a set of two drive gears 216 and the driven gear 224. The speed reduction ratios of the two sets are set equal to each other. However, either of one set may be omitted.

According to the present embodiment, the resilient bodies 87 are interposed between facing plates 85 and 86 of the gear housing 27E and the housing 19E of the sub-assembly SA1 to avoid direct contact between the facing plates 85 and 86, so that the following advantage is obtained. That is, vibration and noise can be prevented from being transmitted from the housing 19E of the sub-assembly SA1 supporting the electric motors 161 and 162, the first speed reduction mechanism 17E, and the worm shaft 23 to the gear housing 27E side supporting the worm wheel 24 and the steering shaft 3.

By setting a distance between the facing plates 85 and 86 of the gear housing 27E and the housing 19E, the backlash amount between the worm 23c and the worm wheel 24 can be adjusted or managed.

The sub-assembly SA1 supporting the electric motors 161 and 162, the first speed reduction mechanism 17E, and the worm shaft 23 is resiliently supported, so that an actuation torque of the second speed reduction mechanism 18 when starting a steering operation can be reduced, and as a result, steering operation feeling can be improved.

Further, power is transmitted to the worm shaft 23 via the driven gears 223 and 224 provided on both ends 23a and 23b of the worm shaft 23, so that the worm shaft 23 can be stably driven.

Figure 18:
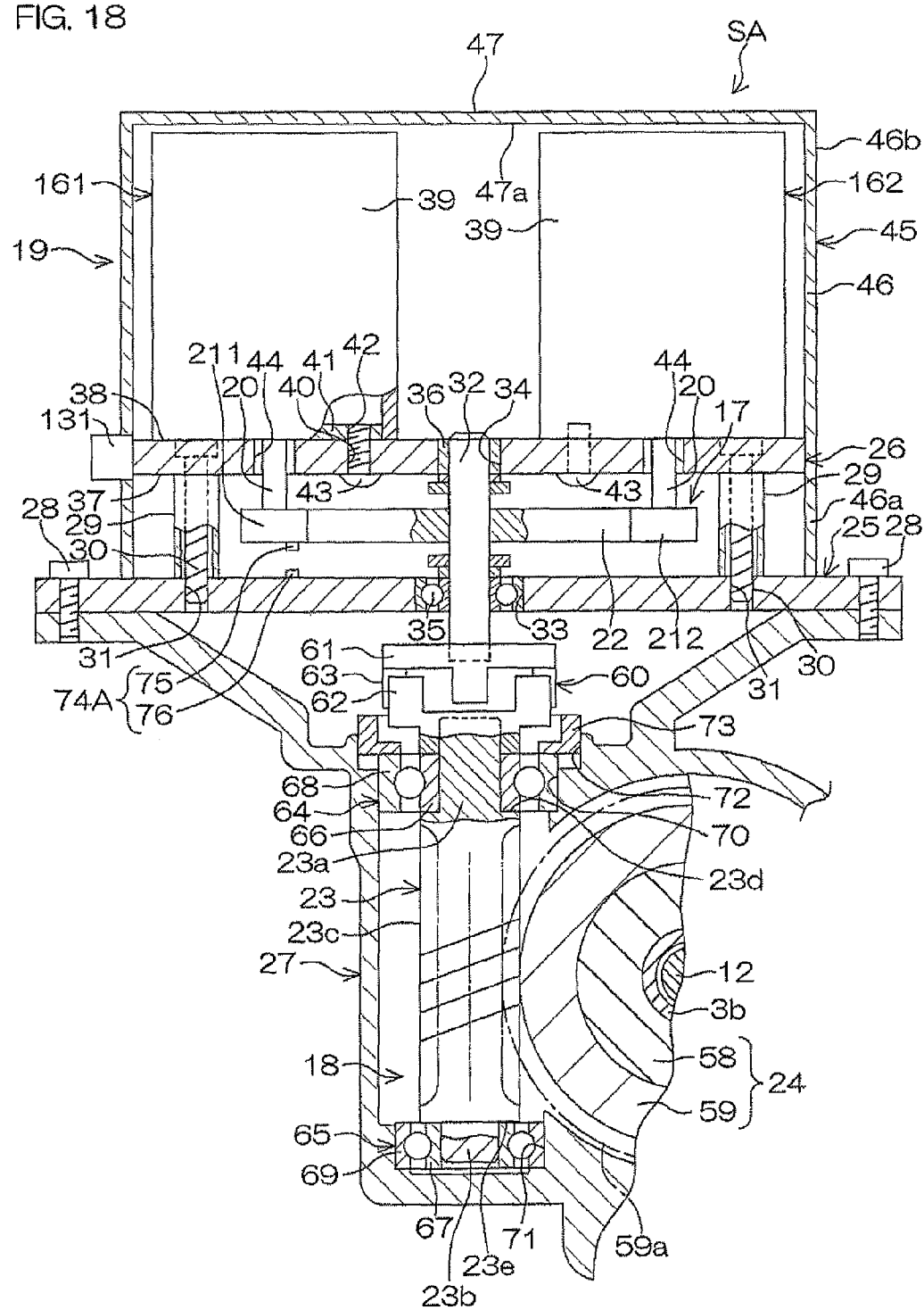
FIG. 18 is a sectional view of an essential portion of an electric power steering device as a vehicle steering apparatus of still another embodiment of the present invention, showing an example using a rotation angle sensor that detects a rotation angle of any one of the drive gears.
Figure 19:
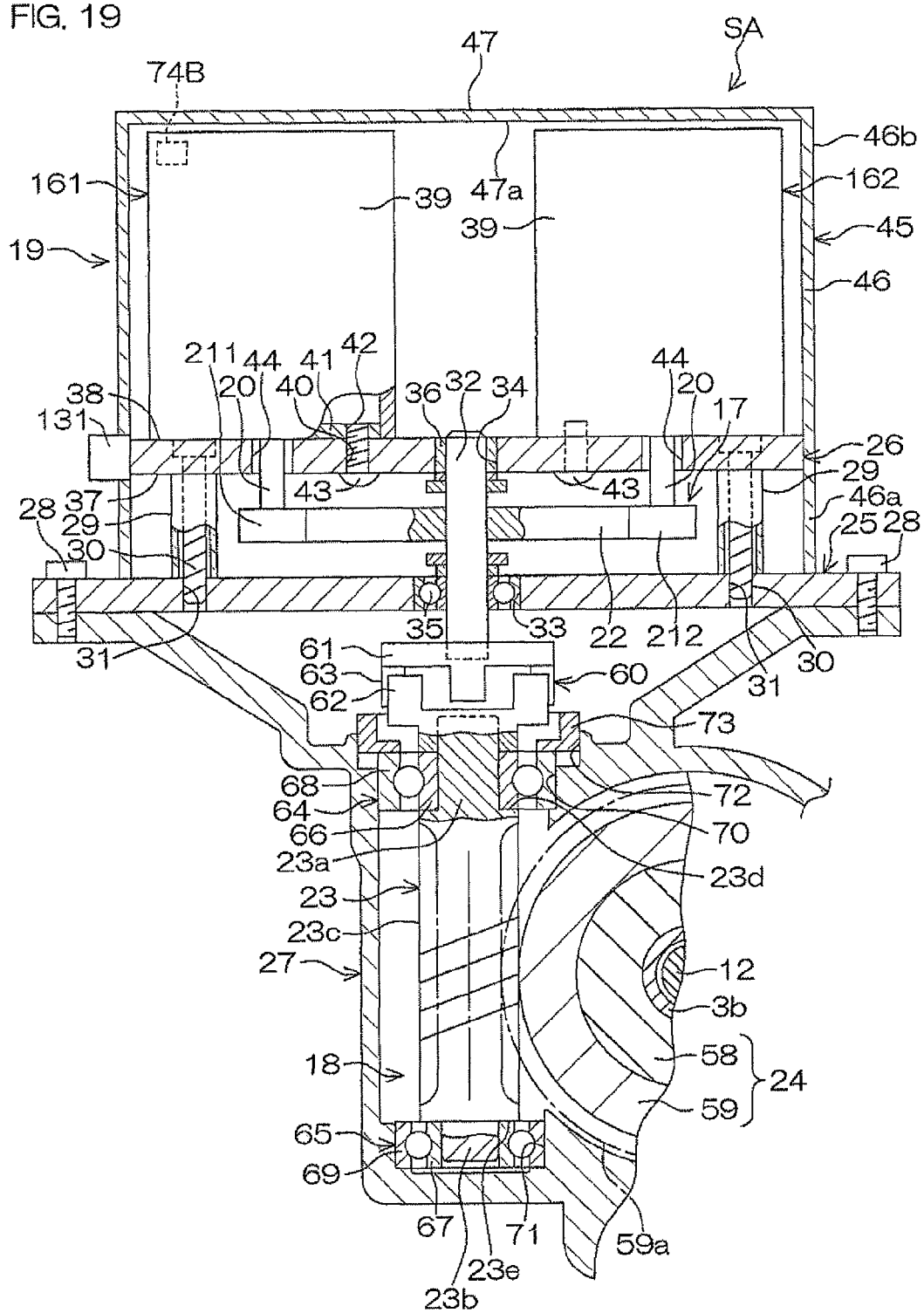
FIG. 19 is a sectional view of an essential portion of an electric power steering device as a vehicle steering apparatus of still another embodiment of the present invention, showing an example using a rotation angle sensor that detects a rotation angle of a rotary shaft of any one of the electric motors.

The present invention is not limited to the above-described embodiments, and for example, as in the embodiment of FIG. 2, when the drive gears 211 and 212 and the driven gear 22 are used as drive members and a driven member, a rotation angle sensor 74A that detects a rotation angle of either one of the drive gears 211 and 212 may be provided as shown in FIG. 18 instead of the rotation angle sensor 74 that detects a rotation angle of the driven gear 22, or a rotation angle sensor 74B that detects a rotation angle of the rotary shaft 20 of either one of the electric motors 161 and 162 may be provided as shown in FIG. 19 instead of the rotation angle sensor 74.

Even in the embodiment of FIG. 17 and FIG. 18, on a stage previous to speed reduction by the second speed reduction mechanism 18, the rotation angle is detected, so that in a case where this vehicle steering apparatus 1 is applied to a parking assistance system, the steering angle can be accurately controlled when assisting parking.

Figure 20A:
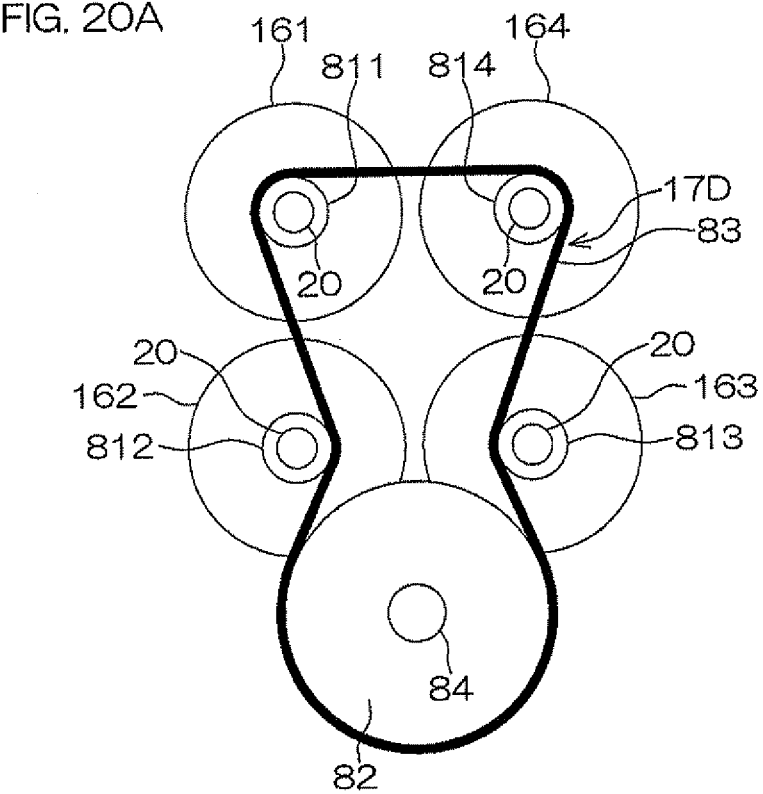
FIG. 20A is a general view of a first speed reduction mechanism and electric motors of still another embodiment of the present invention, showing an example using four electric motors and an endless belt.
Figure 20B:
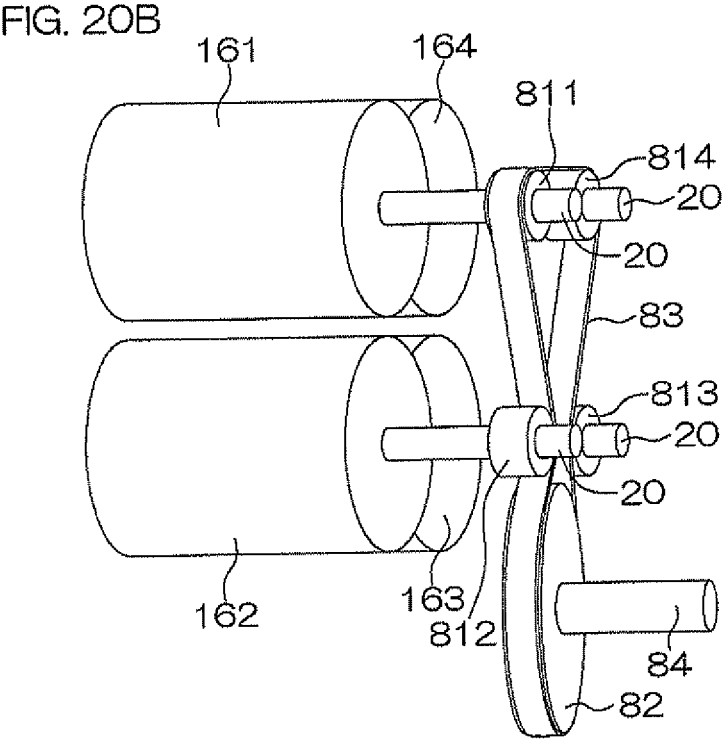
FIG. 20B is a perspective view of the first speed reduction mechanism and the electric motors of FIG. 20A.

In each embodiment described above, a gear mechanism is used as the first speed reduction mechanism, however, the present invention is not limited to this. For example, as shown in FIG. 20A and FIG. 20B, a first speed reduction mechanism 17D consisting of a belt-and-pulley mechanism may be used. Describing a case where four electric motors 161 to 164 are used, drive pulleys 811, 812, 813, and 814 as drive members are attached rotatably integrally to rotary shafts 20 of the first, second, third, and fourth electric motors 161 to 164. These drive pulleys 811 to 814 and a driven pulley 82 as a driven member are joined via an endless belt 83 in a power transmittable manner. A pivot 84 that rotates integrally with the driven pulley 82 serves as an output shaft of the first speed reduction mechanism 17D. The pivot 84 of the driven pulley 82 is joined to a worm shaft of the second speed reduction mechanism via a joint although this is not shown.

Further, the drive pulleys 811 and 814 and the driven pulley 82 joined to the rotary shafts 20 of the first and fourth electric motors 161 and 164 are inscribed about the endless belt 83, and the drive pulleys 812 and 813 joined to the rotary shafts 20 of the second and third electric motors 162 and 163 are circumscribed about the endless belt 83.

In the present embodiment, the degree of freedom of layout of the endless belt 83 is high, so that the degree of freedom of installation of the drive pulleys 811 to 814 and the driven pulley 82 came increased. Eventually, the vehicle steering apparatus 1 can be installed even in a narrow space.

Either the drive pulleys 812 and 813 circumscribed about the endless belt 83 or the drive pulleys 811 and 814 inscribed about the endless belt 83 apply tensions to the endless belt 83 so as to press the endless belt 83 to the other drive pulleys. Therefore, it is not necessary to provide a tensioner for the endless belt 83, separately, and the structure can be simplified.

Figure 21:
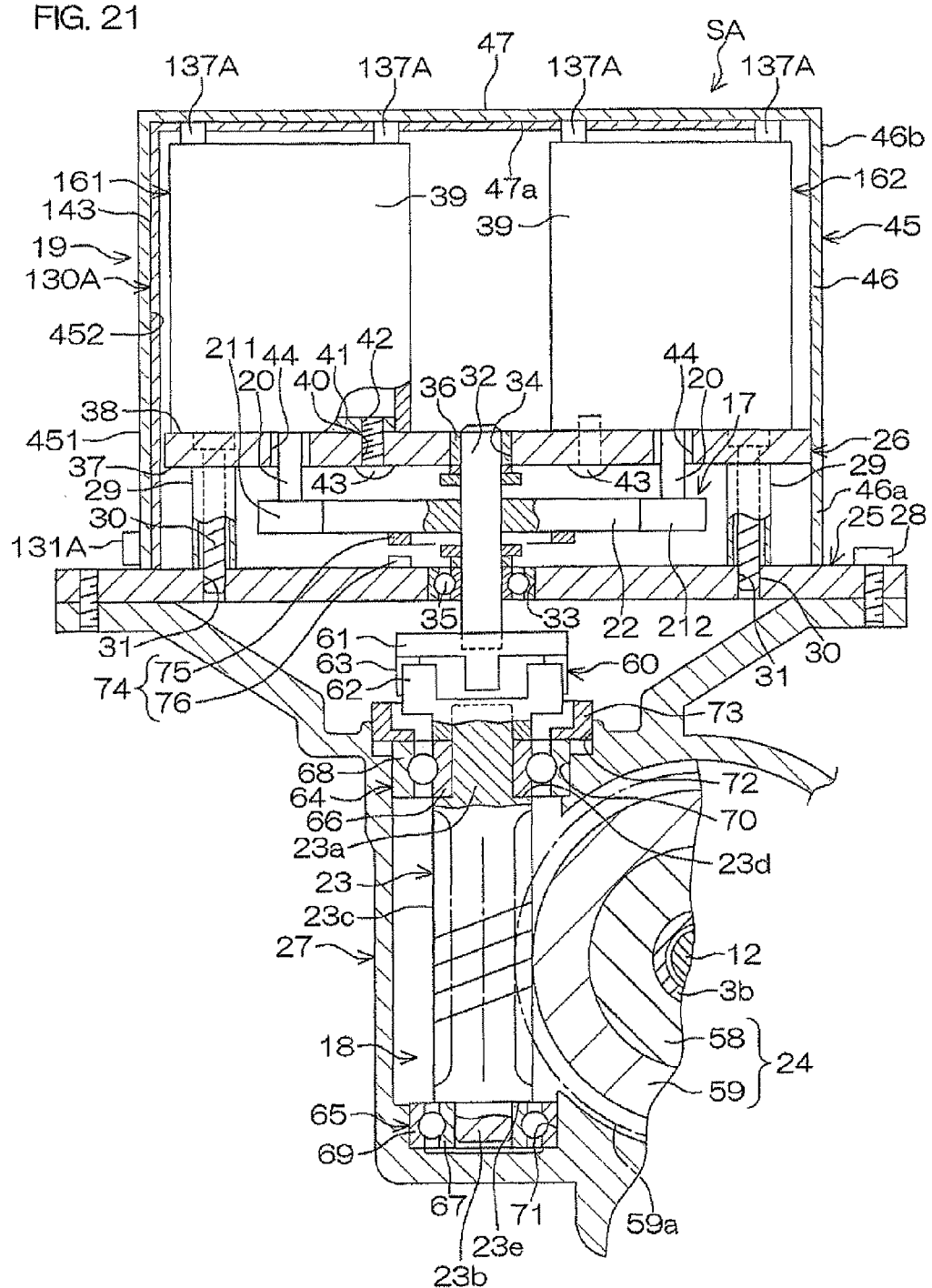
FIG. 21 is a sectional view of an essential portion of an electric power steering device as a vehicle steering apparatus of still another embodiment of the present invention.
Figure 22:
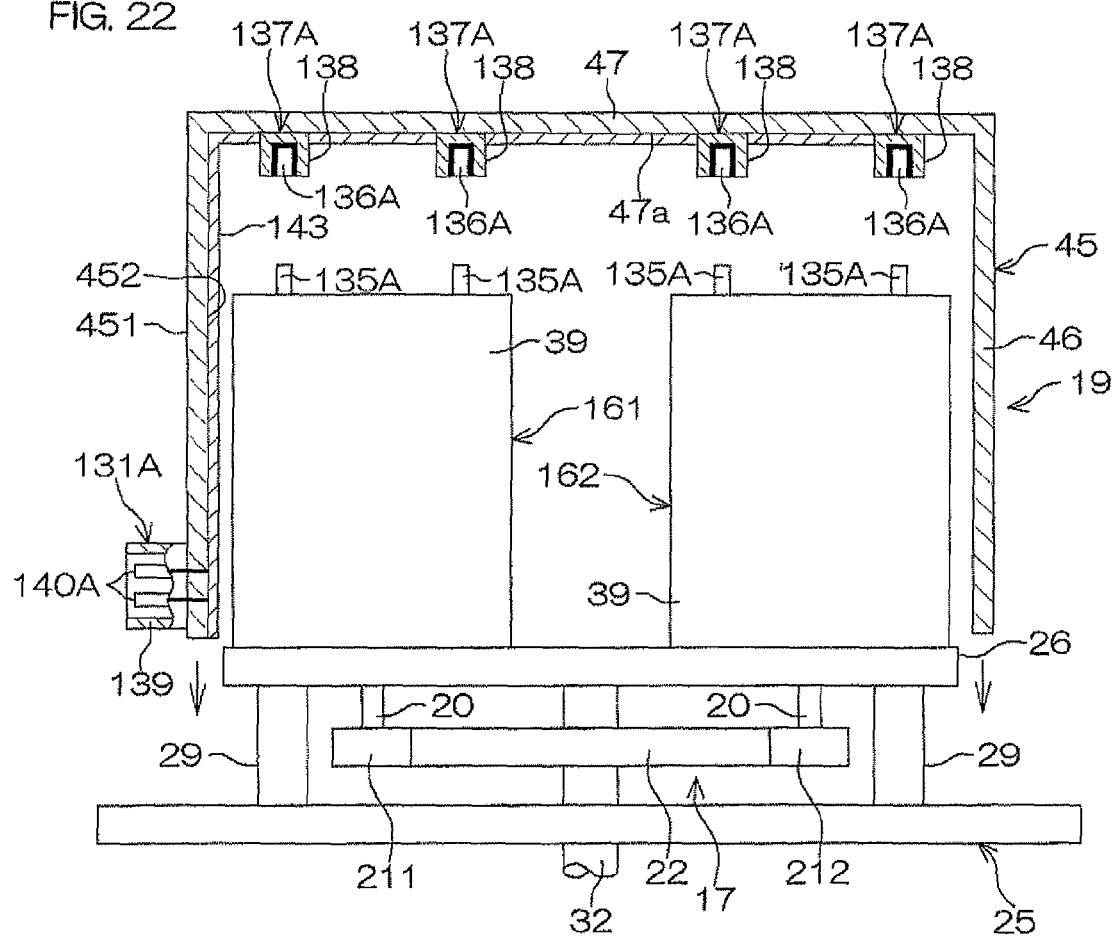
FIG. 22 is a general view showing a step of attaching electric motors to a motor fixing plate in the embodiment of FIG. 21.

Next, FIG. 21 and FIG. 22 show another embodiment of the present invention. Referring to FIG. 21, in the present embodiment an external coupler 131A is attached to the outer surface 451 of a cover housing 45 as an outer surface of the housing 19. A connection member 131A that reaches the electric motors 161 and 162 via a flexible printed board 143 and internal couplers 137A from the external coupler 131A is provided.

As shown in FIG. 22, first terminals 135A project in a direction opposite to the rotary shafts 20 from the motor housings 39 of the electric motors 161 and 162. Further, the internal couplers 137A having second terminals 136A are fixed to the inner surface 47a of an end wall 47 of a cover housing 45.

The second terminals 136A of the internal couplers 137A and third terminals 140A of the external coupler 131A are connected to each other via a flexible printed board 143 installed along the inner surface 452 of the cover housing 45 as an inner surface of the housing 19.

According to the present embodiment, at the time of assembly, simultaneously with covering of the electric motors 161 and 162 and the motor fixing plate 26 by the cover housing 45, the first terminals 135A of the electric motors 161 and 162 can be connected to the second terminals 136A of the internal couplers 137A fixed to the inner surface 47a of the end wall 47 of the cover housing 45, so that the connecting operation can be simplified.

Further, the second terminals 136A of the internal couplers 137A and the third terminals 140A of the external coupler 131A are connected to each other via the flexible printed board 143 installed along the inner surface 452 of the cover housing 45, so that electric cables that are usually used for the electric motors can be omitted. The flexible printed board 143 does not need a large space, and layout thereof is easy.

Figure 23:
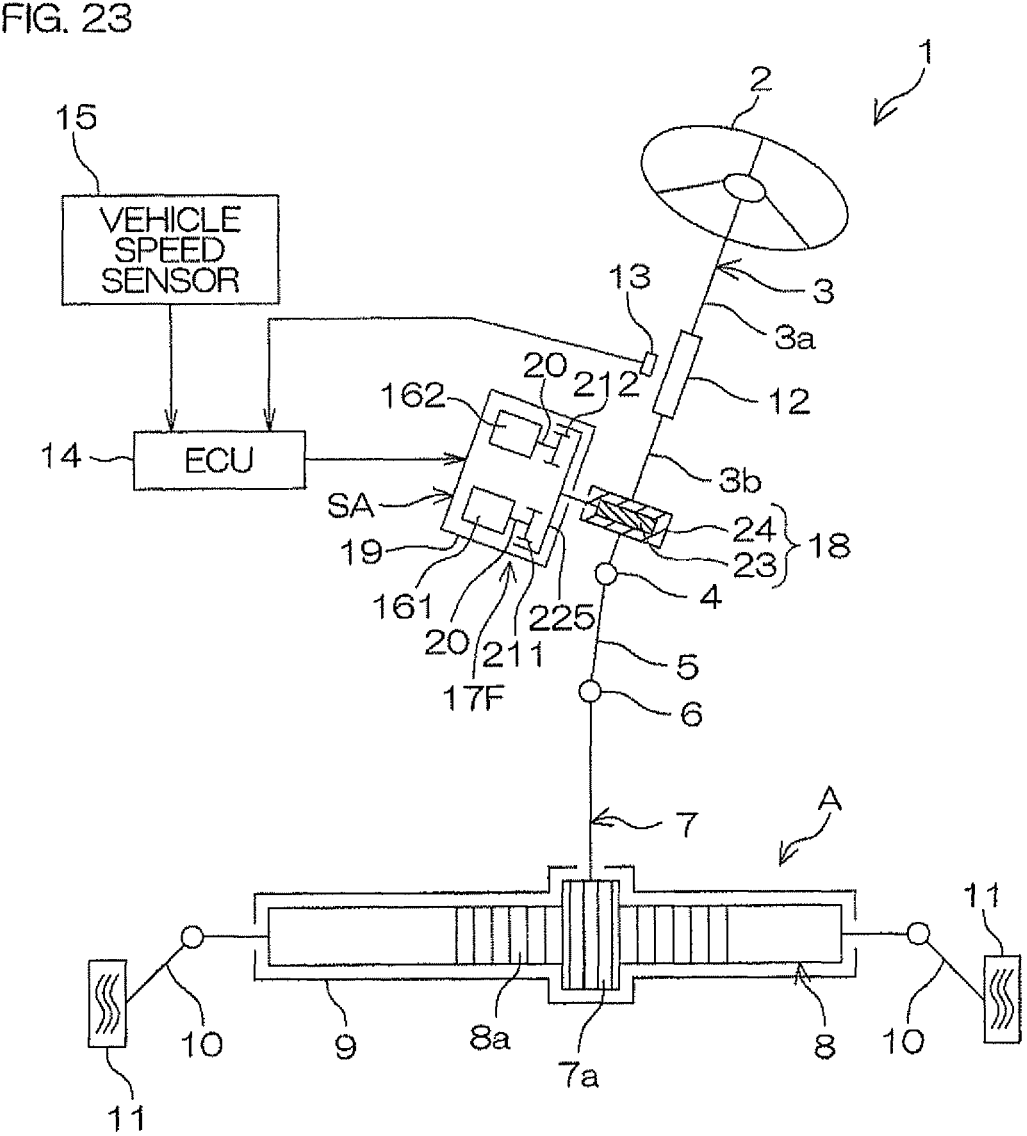
FIG. 23 is a schematic view showing a general configuration of an electric power steering device as a vehicle steering apparatus of still another embodiment of the present invention.

Next, FIG. 23 is a general view schematically showing a configuration of an electric power steering device as a vehicle steering apparatus of still another embodiment of the present invention. Referring to FIG. 23, the present embodiment is different from the embodiment of FIG. 2 as follows. That is, the first speed reduction mechanism 17F includes a driven gear 225 consisting of an internal gear as a driven member that engages with the drive gears 211 and 212.

Figure 24:
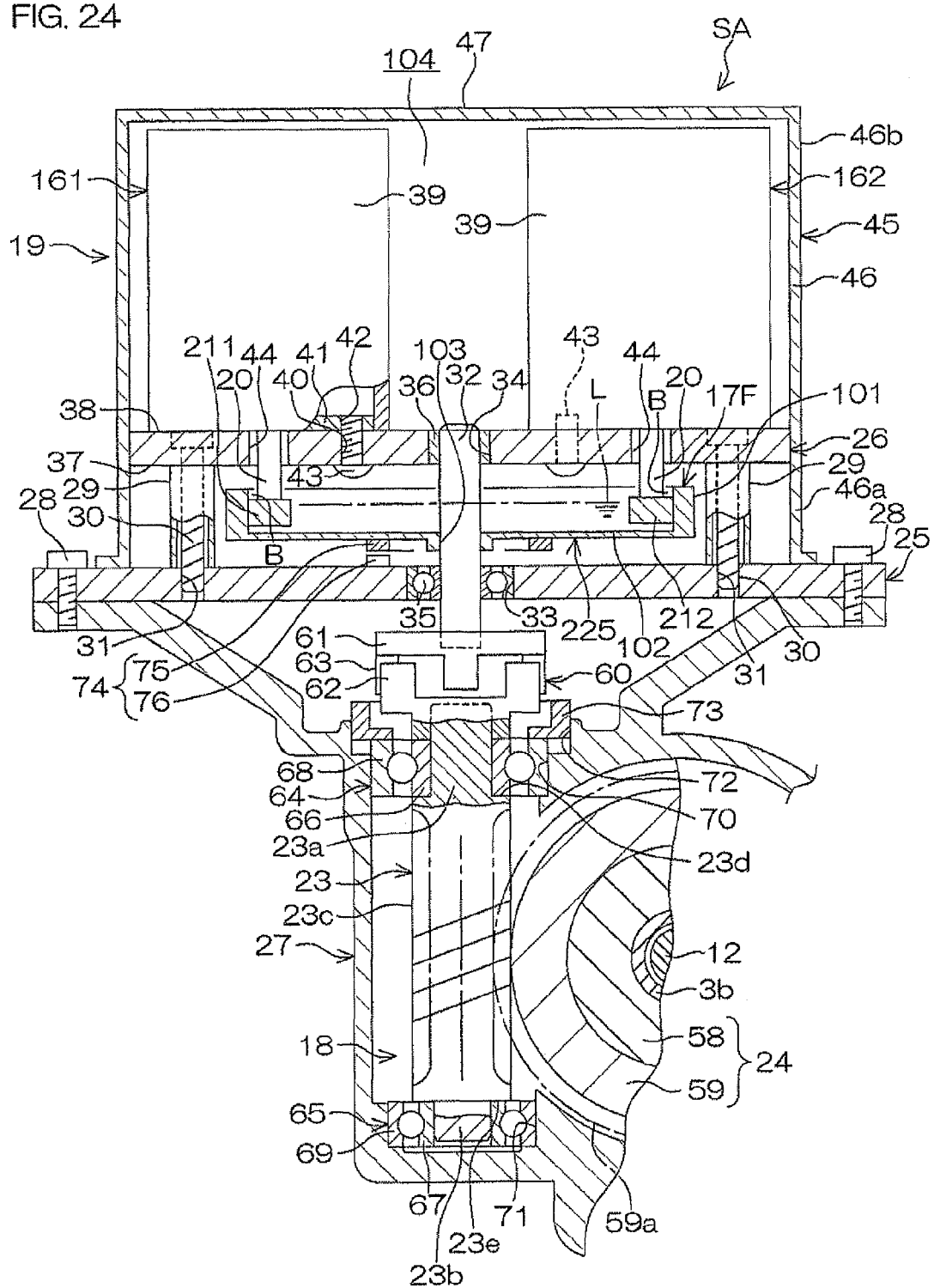
FIG. 24 is a sectional view of an essential portion of the electric power steering device of the embodiment of FIG. 23.
Figure 25:
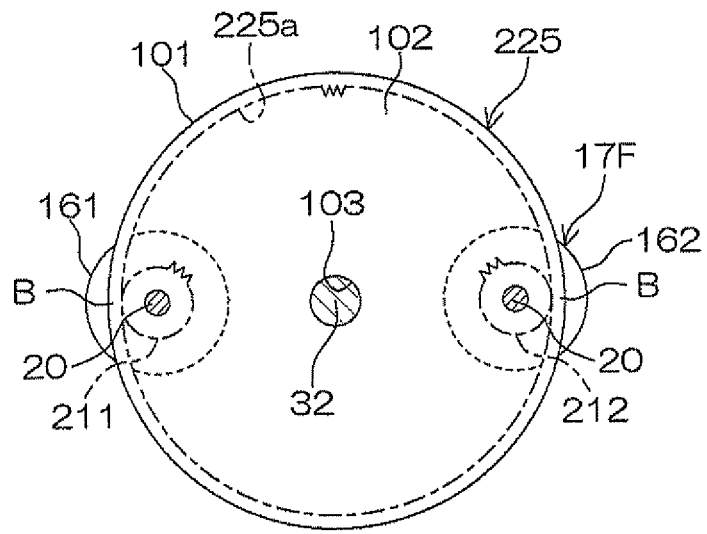
FIG. 25 is a general view showing a layout of electric motors and a first speed reduction mechanism of the embodiment of FIG. 23.

Referring to FIG. 24, the driven gear 225 includes an annular main body 101 and an end wall 102 closing one end of the annular main body 101. On the inner periphery of the main body 101, teeth that engage with the drive gears 211 and 212 are formed. A pivot 32 is fitted rotatably integrally by, for example, press-fitting in a fitting hole 103 formed at the center of the end wall 102. Between the end wall 102 and the motor fixing plate 26, drive gears 211 and 212 are disposed.

The driven gear 225 has a cup shape including the main body 101 and the end wall 102. At least in power transmission regions B on the inner side of the driven gear 225 having the cup shape, a lubricant L such as grease or lubricating oil is filled. Specifically, the space inside the driven gear 225 having the cup shape functions as a lubricant reservoir. The lubricant L stored in the driven gear 225 is subjected to a centrifugal force caused by rotation of the driven gear 225 and collected to the inner periphery 225a of the driven gear 225, so that the lubricant L can be sufficiently held on the inner periphery 225a of the driven gear 225. Therefore, vibration and noise in the power transmission regions B between the driven gear 225 and the drive gears 211 and 212 inscribed about the driven gear can be reduced.

As the lubricant L, a lubricant composition containing a base oil, polymer, and a thickener is preferably used because it can provide a satisfactory damping effect for noise prevention. In particular, in order to obtain an excellent damping effect, it is preferable that the complex modulus of the lubricant L is in a range not less than 1 KPa and not more than 3.3 KPa.

As a base oil constituting the lubricant composition, a synthetic hydrocarbon oil (for example, poly-a olefin oil (PAO)) is preferably used, however, synthetic oil such as silicone oil, fluorine oil, ester oil, and ether oil or mineral oil can also be used. The above-described base oils may be used singly, or two or more kinds may be used in combination. As a base oil, as described above, for suppression of an increase in rotational torque in a wide temperature range, a base oil with viscosity as low as possible is preferably used, however, if the viscosity is excessively low, the oil film thickness and complex modulus of the lubricant composition may not satisfy the above-described ranges. Therefore, considering these properties, a base oil the kinetic viscosity at 40° C. of which is not less than 10 mm$^2$/s (40° C.) and not more than 100 mm$^2$/s (40° C.), more preferably, not less than 20 mm$^2$/s (40° C.) and not more than 40 mm$^2$/s (40° C.) is preferably used.

As a polymer, various polymers that can function as a thickener when being combined with the base oil can be used, and in particular, as a polymer that has excellent durability and can continuously function as a thickener for a long period of time when it is combined with a synthetic hydrocarbon oil such as PAO, at least one kind selected from a group consisting of polyisoprenes such as cis-1,4-polyisoprene described above and polyester polyol can be used. As the polymer, a polymer that has viscosity capable of composing a lubricant composition the oil film thickness and complex modulus of which can satisfy the above-described ranges when it is combined with the predetermined base oil can be selected and used.

The detailed range of viscosity not especially limited, however, in order to compose a lubricant composition the oil film thickness and complex modulus of which can satisfy the above-described ranges when it is combined with a base oil having a kinetic viscosity satisfying the above-described favorable range, a polymer the kinetic viscosity at 40° C. of which is not less than 1000 mm$^2$/s (40° C.) and not more than 10000 mm$^2$/s (40° C.), more preferably, not less than 3000 mm$^2$/s (40° C.) and not more than 7000 mm$^2$/s (40° C.) is preferably used. The content percentage of the polymer is not especially limited, however, in order to compose a lubricant composition the oil film thickness and complex modulus of which can satisfy the above-described favorable ranges by combining a base oil and a polymer that have kinetic viscosities satisfying the preferred ranges, the content percentage of the polymer to the total amount of the base oil, the polymer, and the thickener is preferably not less than 20 mass percent and not more than 40 mass percent.

As the thickener, conventionally known various thickeners can be used such as a soap thickener, an urea thickener, an organic thickener, and an inorganic thickener can be used. Among these, as a soap thickener, metal soap thickeners such as an aluminum soap, a calcium soap, a lithium soap, and a sodium soap, mixed soap thickeners such as lithium-calcium soap and sodium-calcium soap, and a sodium soap, and complex thickeners such as an aluminum complex, a calcium complex, a lithium complex, and a sodium complex are available, and particularly, a lithium soap such as lithium stearate is preferably used.

As an urea thickener, polyurea, etc., are available, and as an organic thickener, polytetrafluoroethylene (PTFE) and sodium terephthalate, etc., are available. Further, as an inorganic thickener, organic bentonite, graphite, and silica gel, etc., are available. To the lubricant composition, a solid lubricant such as a fluorine resin (PTFE, etc.), molybdenum disulfide, graphite, and polyolefin wax (containing amide, etc.), a phosphorus or sulfur extreme-pressure additive, an antioxidant such as tributylphenol or methylphenol, a corrosion inhibitor, a metal deactivator, a viscosity index improver, and an oiliness improver, etc., may be added.

The lubricant composition preferably contains buffer particles. The buffer particles are interposed in the engagement portion between gears that engage with each other, and has an effect of reducing particularly rattle noise by functioning as a buffer material to buffer collisions between tooth flanks of the drive gears 211 and 212 and the driven gear 225, and can further effectively reduce abnormal noise caused by rotation of the first speed reduction mechanism 17F.

As the buffer particles, particles made of at least one kind of material are selected from a group consisting of soft resins having rubber resilience and rubber.

As the soft resin that becomes a material of the buffer particles, for example, a polyolefin resin, a polyamide resin, a polyester resin, a polyurethane resin, a polyacetal resin, a polyphenylene oxide resin, a polyimide resin, and a fluorine resin, etc., are available.

As the rubber, oilproof rubbers such as ethylene-propylene copolymer rubber (EPM), ethylene-propylene-diene copolymer rubber (EPDM), silicone rubber, and urethane rubber (U) are available. In addition, the buffer particles may be made by using olefin-based, urethane-based, polyester-based, polyamide-based, or fluorine-based oilproof thermoplastic elastomer. Among these, buffer particles made of a polyurethane resin synthesized by reacting polyol, a crosslinking agent, and polyisocyanate as starting ingredients that compose a repeating unit are preferable.

The buffer particles made of the polyurethane resin can be produced according to a so-called dispersion polymerization method in which polyurethane resin is synthesized by reacting the mixed liquid of the above-described ingredients in a droplet dispersed state in a nonaqueous dispersion medium that does not dissolve the above-described ingredients. According to this dispersion polymerization method, an advantage is obtained in which the buffer particles with uniform particle diameters made of a polyurethane resin can be efficiently produced while maintaining the spherical shapes of the droplets dispersed in the dispersion medium. Further, as described above, another advantage is also obtained in which the elastic modulus and hardness, etc., of the buffer particles can be adjusted in an arbitrary range by adjusting the kinds and content percentages of the ingredients.

For the particle diameters of the buffer particles, an optimal range can be set according to the configuration of the gear device to be lubricated, in particular, backlash, etc. In order to adjust the average particle diameter of the buffer particles produced according to the dispersion polymerization method, the particle diameters of droplets of the mixed liquid to be dispersed in the dispersion medium are changed by changing the dispersion conditions, etc. The shape of the buffer particle may be amorphous or other shapes, however, for improvement in fluidity of the lubricant composition, for improvement in rolling performance between tooth flanks, and for suppressing an increase in torque of the drive transmission mechanism, that is, for suppressing an increase in steering torque of the electric power steering device, the above-described spherical shape is preferable.

The elastic modulus of a soft resin, etc., forming the buffer particles is preferably not less than $10^{-1}$ MPa and not more than $10^4$ MPa, more specifically, not less than $5 \times 10^{-1}$ MPa and not more than $10^2$ MPa in, for example, a range of the use temperature of the lubricant composition. If the elastic modulus is less than the above-described range, there is a possibility that the effect of buffering the energy of engagement of the gears constituting the gear device and reducing rattle noise cannot be sufficiently obtained, and noise in the cabin cannot be sufficiently reduced. In order to adjust the oil film thickness and complex modulus of the lubricant composition so as not to exceed the above-described ranges, for example, the kind and viscosity of the base oil, the kind, viscosity, and content percentage, etc., of the polymer, the kind and content percentage of the thickener, the elastic modulus, particle diameter, and content percentage of the buffer particles, and kinds and content percentages of additives such as a viscosity index improver and a oiliness improver, etc., are adjusted.

Figure 26:
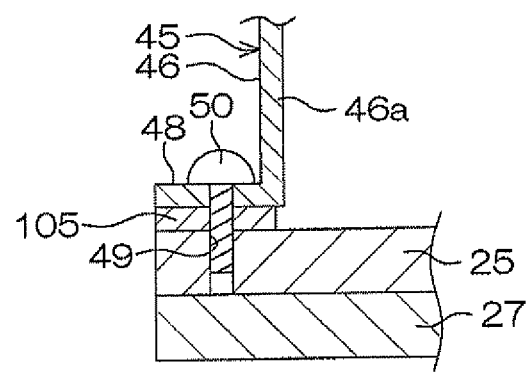
FIG. 26 is a sectional view of an essential portion of a housing of a sub-assembly of the electric power steering device of the embodiment of FIG. 23.

As shown in FIG. 26, between the attaching flange 48 and the base plate 25, a sealing member 105 consisting of, for example, an annular rubber plate is interposed in a compressed state for sealing between the attaching flange 48 and the base plate 25. By using a fixation screw 50 inserted through the attaching flange 48 and the sealing member 105 and inserted into a screw hole 49 of the base plate 25, the cover housing 45 is fixed to the base plate 45.

The housing space 104 inside the housing 19 for housing the first and second electric motors 161 and 162 and the first speed reduction mechanism 17F is hermetically sealed by the sealing member 105, and accordingly, the lubricant L is prevented from leaking to the outside of the housing 19.

According to the present embodiment, the lubricant L stored in the driven gear 225 is subjected to a centrifugal force caused by rotation of the driven gear 225 and collected to the inner periphery 225a of the driven gear 225, so that the lubricant L can be sufficiently held on the inner periphery 225a of the driven gear 225. Therefore, vibration and noise in the power transmission regions B between the driven gear 225 and the drive gears 211 and 212 inscribed about the driven gear 225 can be reduced.

Figure 27:
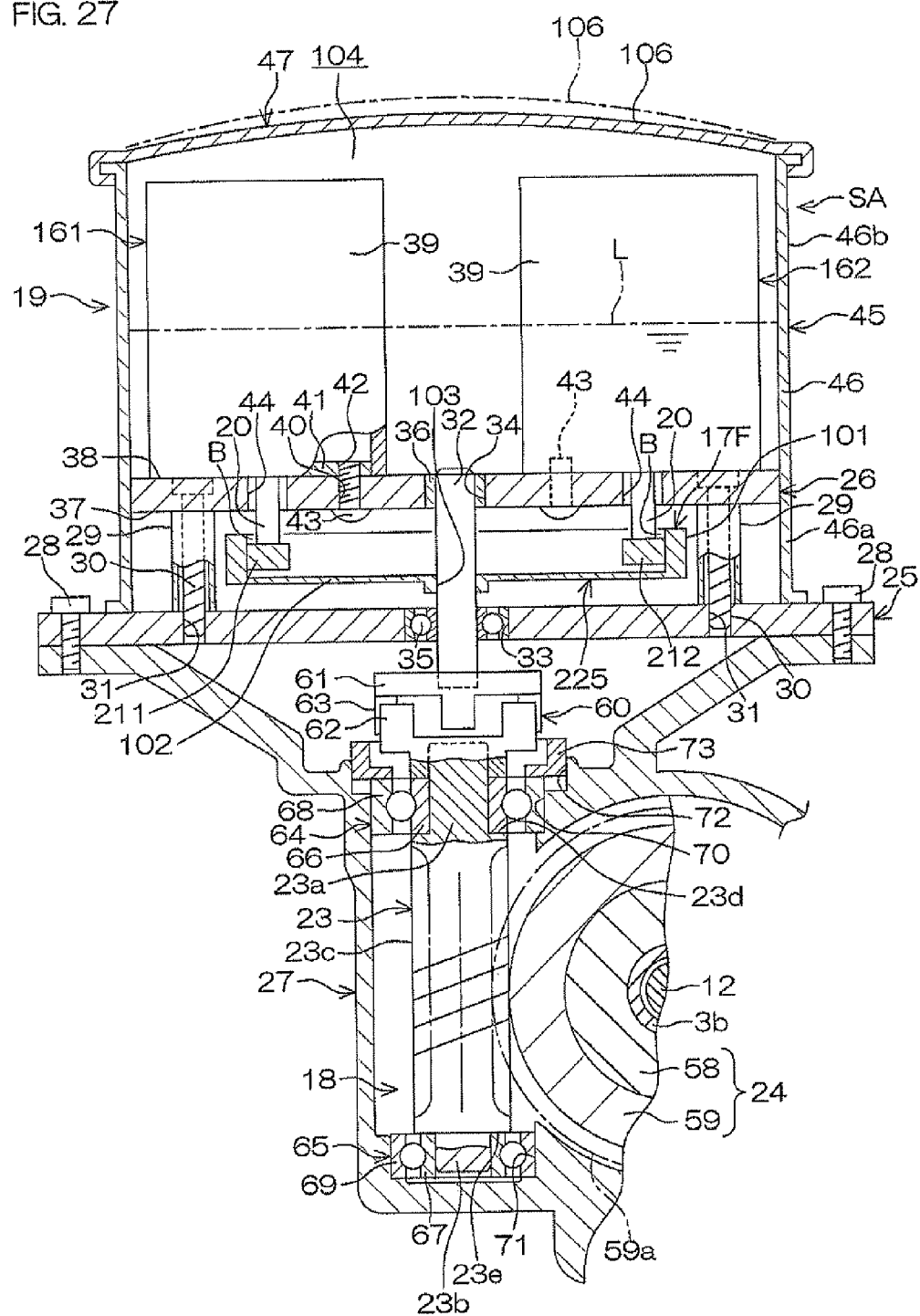
FIG. 27 is a sectional view of an essential portion of an electric power steering device as a vehicle steering apparatus of still another embodiment of the present invention.

Next, FIG. 27 shows still another embodiment of the present invention. Referring to FIG. 27, the present embodiment is different from the embodiment of FIG. 24 mainly in the following point. That is, in the embodiment of FIG. 24, the lubricant L is filled in the driven gear 225 consisting of an internal gear. On the other hand, in the present embodiment, inside the housing 19 of the sub-assembly SA, lubricant L of a sufficient amount to reach a position above the motor fixing plate 26 is filled. Therefore, the first speed reduction mechanism 17F below the motor fixing plate 26 is in the lubricant L, so that engagement noise can be reduced for a long period of time.

A part of the housing 19, for example, at least a part of the end wall 47 of the cover housing 45 consists of, for example, a rubber-made bellows or another flexible member 106. When the lubricant L sufficiently filled in the housing 19 increases the capacity due to thermal expansion, the flexible member 106 swells out to absorb the increase in capacity as shown by the alternate long and two short dashed lines in FIG. 27. The capacity of the air space inside the housing space 104 of the housing 19 can be secured, and as a result, a pressure increase and a temperature rise in the housing 19 can be suppressed.

Figure 28:
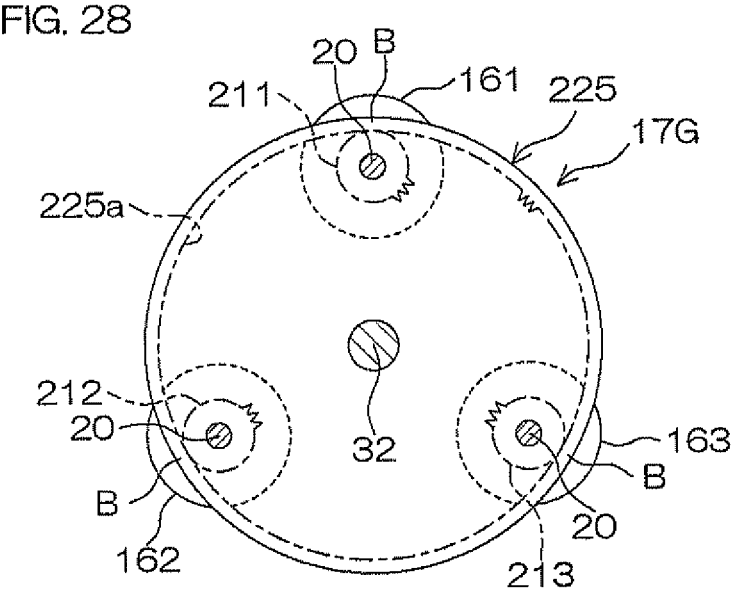
FIG. 28 is a general view of a first speed reduction mechanism of still another embodiment of the present invention, showing an example using three electric motors.

In the embodiment of FIG. 24, two electric motors 161 and 162 are used as an actuator, however, the present invention is not limited to this. For example, as shown in the first speed reduction mechanism 17G of FIG. 28, first, second, and third electric motors 161, 162, and 163 may be used. In this case, drive gears 211, 212, and 213 joined to the rotary shafts 20 of the electric motors 161 to 163, respectively, are also disposed at even intervals in the circumferential direction of the driven gear 225.

Figure 29:
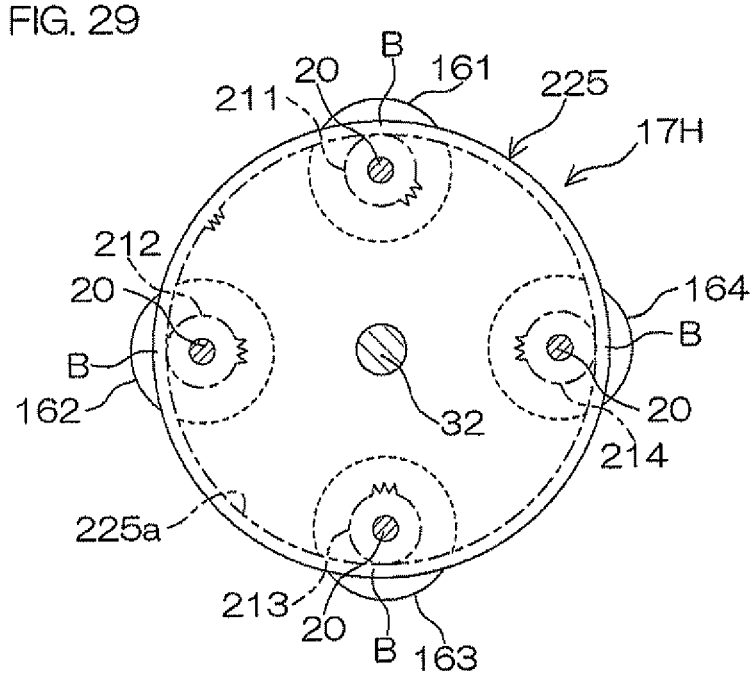
FIG. 29 is a general view of a first speed reduction mechanism of still another embodiment of the present invention, showing an example using four electric motors.

Alternatively, as shown in FIG. 29, four electric motors 161, 162, 163, and 164 may be used. In this case, in the first speed reduction mechanism 17H drive gears 211, 212, 213, and 214 joined to the rotary shafts 20 of the electric motors 161, 162, 163, and 164, respectively, are also disposed at even intervals in the circumferential direction of the driven gear 225.

Figure 30:
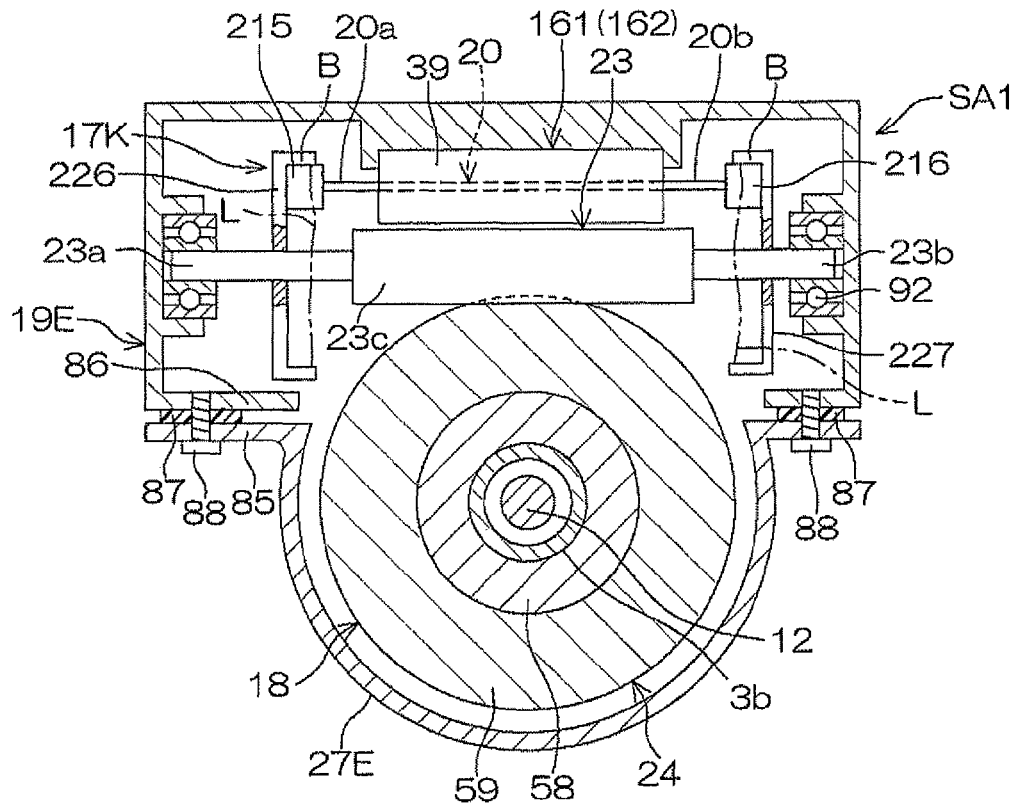
FIG. 30 is a general sectional view of an essential portion of an electric power steering device as a vehicle steering apparatus of still another embodiment of the present invention.
Figure 31:
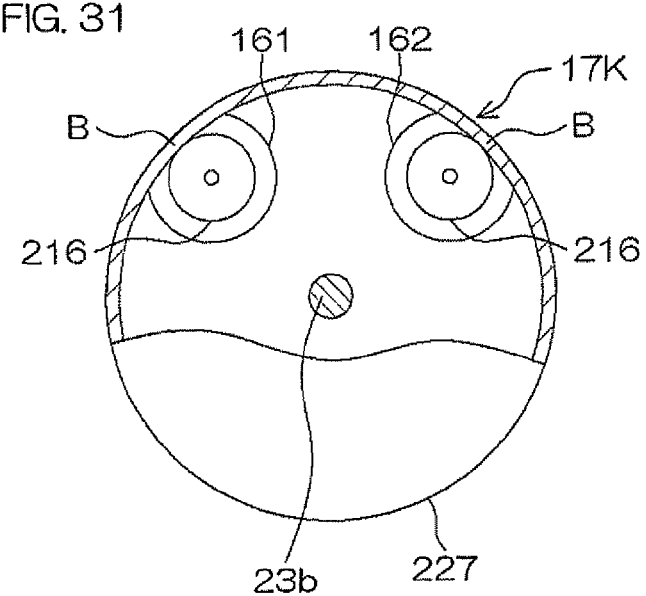
FIG. 31 is a schematic sectional view of an essential portion of the electric power steering device of FIG. 30.

Next, FIG. 30 and FIG. 31 shows still another embodiment of the present invention. The present embodiment is different from the embodiment of FIG. 15 in that a first speed reduction mechanism 17K is used instead of the first speed reduction mechanism 17E of the embodiment of FIG. 15. In the first speed reduction mechanism 17K, a drive gear 215 joined rotatably integrally to one ends 20a of the rotary shafts 20 of the electric motors 161 and 162 is engaged with a driven gear 226 consisting of an internal gear joined rotatably integrally to a first end portion 23a of a worm shaft 23.

On the other hand, a drive gear 216 joined rotatably integrally to the other ends 20b of the rotary shafts 20 of the electric motors 161 and 162 is engaged with a driven gear 227 consisting of an internal gear joined rotatably integrally to a second end portion 23b of the worm shaft 23.

Specifically, the first speed reduction mechanism 17K is arranged to have two parallel transmission paths including a set of the two drive gears 215 and the driven gear 226 and a set of the two drive gears 216 and the driven gear 227. The speed reduction ratios of these sets are set equal to each other. However, either of one set may be omitted.

On the inner sides of the driven gear 226 and the driven gear 227, the same lubricant L as in the embodiment of FIG. 24 is filled to reduce noise. A component of the present embodiment identical to a component of the embodiment of FIG. 15 is designated by the same reference numeral as that of the component of the embodiment of FIG. 15.

Figure 32:
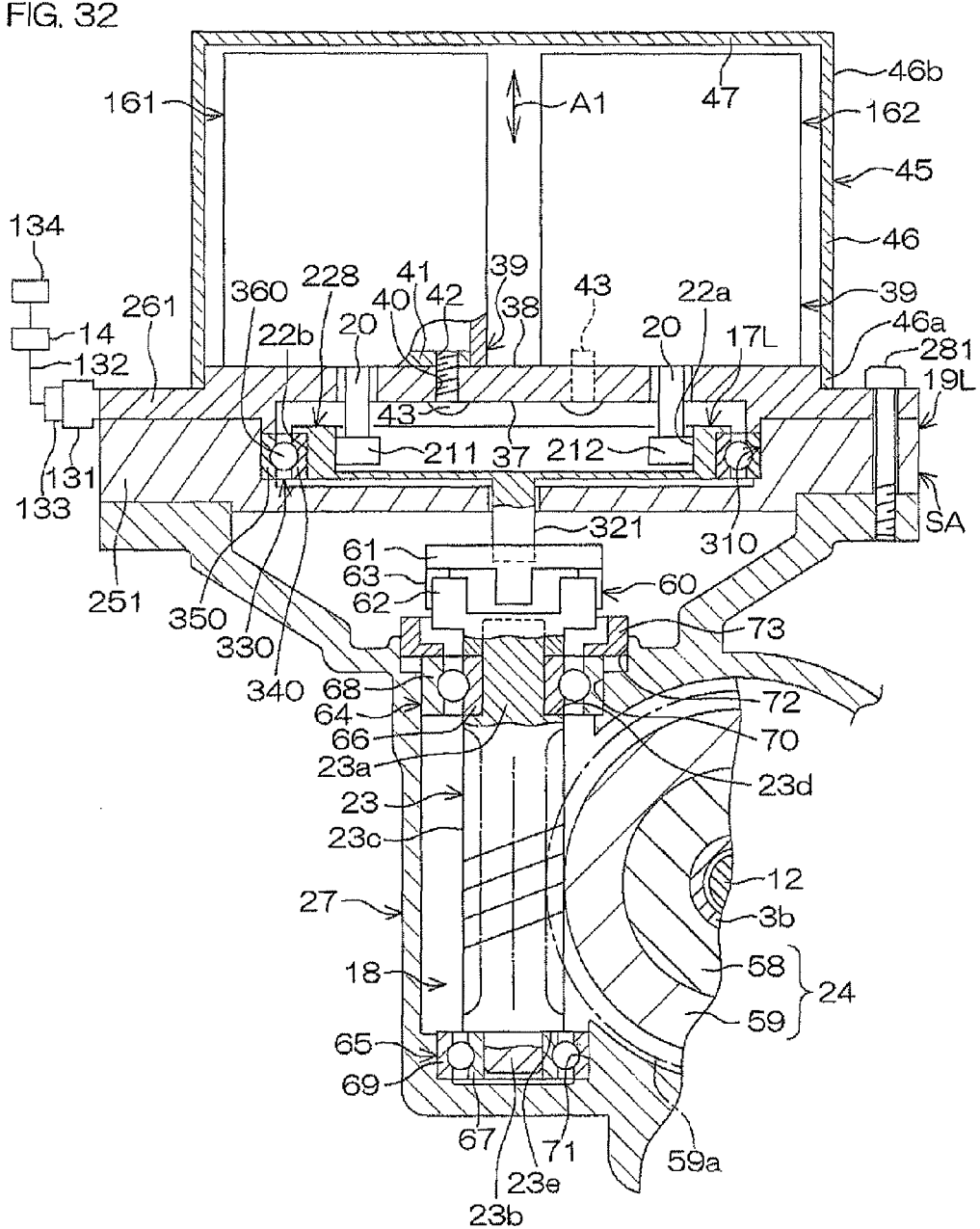
FIG. 32 is a sectional view of an essential portion of an electric power steering device as a vehicle steering apparatus of still another embodiment of the present invention.
Figure 33:
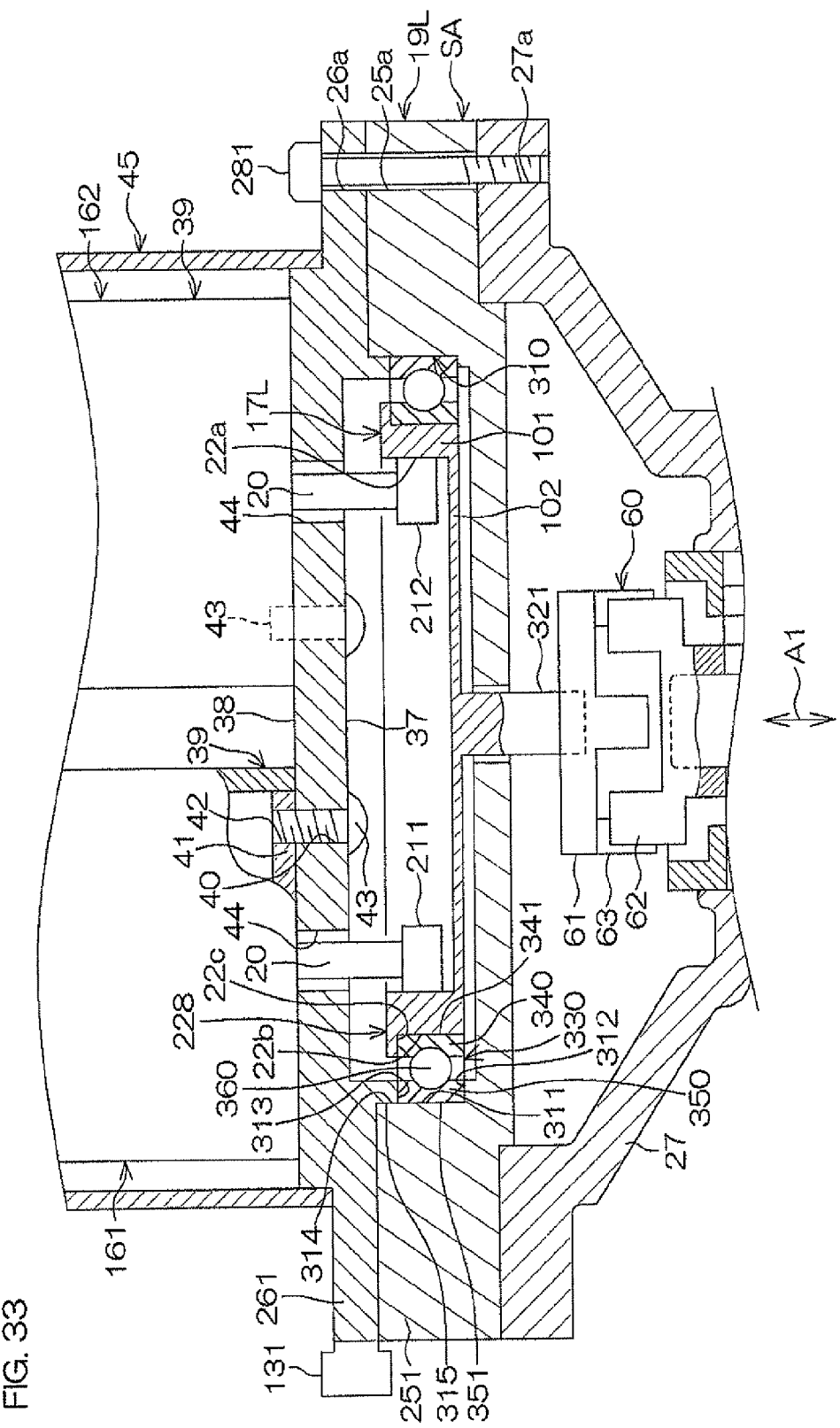
FIG. 33 is an enlarged sectional view of an essential portion of the electric power steering device of FIG. 32.

Next, FIG. 32 and FIG. 33 show still another embodiment of the present invention. Referring to FIG. 32, the present embodiment is different from the embodiment of FIG. 24 mainly in the following point. That is, in the embodiment of FIG. 24, a pair of end portions of the pivot 32 penetrating through the driven gear 22 of the first speed reduction mechanism 17F are supported by first and second bearings 35 and 36, respectively, and accordingly, the driven gear 22 is supported rotatably. On the other hand, in the present embodiment, the first and second bearings 35 and 36 are omitted, and the outer periphery 22b of the driven gear 228 is supported rotatably by a bearing 330.

A joint shaft 321 projecting from the center of the end wall 102 of the driven gear 228 is joined coaxially to the worm shaft 23 via a joint 60 in a power transmittable manner. The bearing 330 is retained in a support hole 310 formed in the housing 19L, and fitted to the outer periphery 22b of the driven gear 228.

To the outer peripheral portion of the motor fixing plate 261, an external coupler 131 for supplying power to the first and second electric motors 161 and 162 from the outside is attached. To the external coupler 131, a coupler 133 provided on one end of a power cable 132 as external wiring is connected. The other end of the power cable 132 is connected to a power supply 134 as an electric element. In detail, the power supply 134 includes a car battery. The other end of the power cable 132 is connected to the ECU 14, and electrically connected to the battery via the ECU 14.

Referring to FIG. 33, the bearing 330 consists of a rolling bearing. The bearing 330 includes an inner race 340, an outer race 350, and a plurality of rollers 360. The rollers 360 are interposed between the inner race 340 and the outer race 350, and are, for example, balls.

The central axis (rotational axis) of the bearing 330 is disposed in parallel to the central axes lines of the rotary shafts 20 of the electric motors 161 and 162. The bearing 330 and the driven gear 228 are disposed concentrically.

The inner periphery of the bearing 330 is formed by the inner periphery 341 of the inner race 340, and press-fitted to the outer periphery 22b of the driven gear 228. On the outer periphery 22b of the driven gear 228, an annular projection is formed, and an end face of the inner race 340 is in contact with a restricting portion 22c formed by an end face of the annular projection. Accordingly, the inner race 340 is positioned on the driven gear 228 in the axial direction A1 of the driven gear 228 (hereinafter, simply referred to as axial direction A1).

The outer periphery of the bearing 330 is formed by the outer periphery 351 of the outer race 350, and retained by the housing 19L. The housing 19L has the support hole 310 for supporting the bearing 330.

The support hole 310 includes an inner peripheral surface 311 and a positioning stepped portion 342 formed on the inner peripheral surface 311. On the other hand, the annular projection 313 formed on the first surface 37 of the motor fixing plate 261 is fitted in the support hole 310. A fitting surface 314 of the inner periphery of the entrance of the support hole 310 is fitted to a fitting surface 315 of the outer periphery of the annular projection 313.

The end face of the annular projection 313 and the positioning stepped portion 342 face to each other in the axial direction A1.

The outer periphery 351 of the outer race 350 of the bearing 330 is fitted to the inner peripheral surface 311 of the support hole 310. One end face of the outer race 350 of the bearing 330 is in contact with the positioning stepped portion 312 of the support hole 310. The other end face of the outer race 350 of the bearing 330 is in contact with the end face of the annular projection 313 of the motor fixing plate 261.

The base plate 251 and the motor fixing plate 261 are fastened to each other by a fixation screw 281 as a fastening member. The fixation screw 281 is inserted through a screw insertion hole 26a of the motor fixing plate 261 and inserted through a screw insertion hole 25a of the base plate 251. A male thread of the fixation screw 281 is screw-fitted to a female thread of the screw hole 27a of the gear housing 27. A head portion of the fixation screw 281 and the gear housing 27 sandwich the base plate 251 and the motor fixing plate 261 in a pressing state. Accordingly, the base plate 251, the motor fixing plate 261, and the gear housing 27 are fixed to each other by the fixation screw 281.

In this state, the positioning stepped portion 312 formed on the base plate 251 and the annular projection 313 formed on the motor fixing plate 261 sandwich the outer race 350 of the bearing 330 from both sides of the axial direction A1. Accordingly, the outer race 350 of the bearing 330 is supported on the housing 19L while being restricted from moving in the axial direction A1.

According to the present embodiment, the bearing 330 supports the outer periphery 22b of the driven gear 228, so that at least a part of the driven gear 228 and the bearing 330 are disposed at the same position in the axial direction A1 of the driven gear 228. As a result, in the axial direction A1 of the driven gear 228, the first speed reduction mechanism 17L can be downsized. Therefore, in the case where rotational outputs of the electric motors 161 and 162 described above as an actuator are reduced in speed in two stages by the first and second speed reduction mechanisms 17L and 18, the electric power steering device 1 can be downsized.

Further, a housing 19L for housing the first speed reduction mechanism 17L is provided, and the bearing 330 includes the inner race 340, the outer race 350, and a plurality of rollers 360 interposed between the inner race 340 and the outer race 350. To the inner periphery 341 of the inner race 340, the outer periphery 22b of the driven gear 228 is fitted. The outer periphery 351 of the outer race 350 is fitted in a support hole 310 formed in the housing 19L. In this case, the driven gear 228 can be supported in the support hole 310 of the housing 19L via the outer race 350, the rollers 360, and the inner race 340 of the bearing 330.

The bearing 330 can uniformly support nearly the entire circumference of the driven gear 228. Along with this, a large-diameter bearing with high rigidity can be used as the bearing 330. Therefore, the driven gear 228 can be supported with high rigidity.

Among the components of the present embodiment, a component of the present embodiment identical to a component of the embodiment of FIG. 24 is designated by the same reference numeral as that of the component of the embodiment of FIG. 24.

In the present embodiment, the same lubricant L as in the embodiment of FIG. 24 may be filled inside the driven gear 228. When the lubricant L is not filled, the cover housing 45 may be omitted.

Next, FIG. 34 to FIG. 38 show still another embodiment of the present invention.

Figure 34:
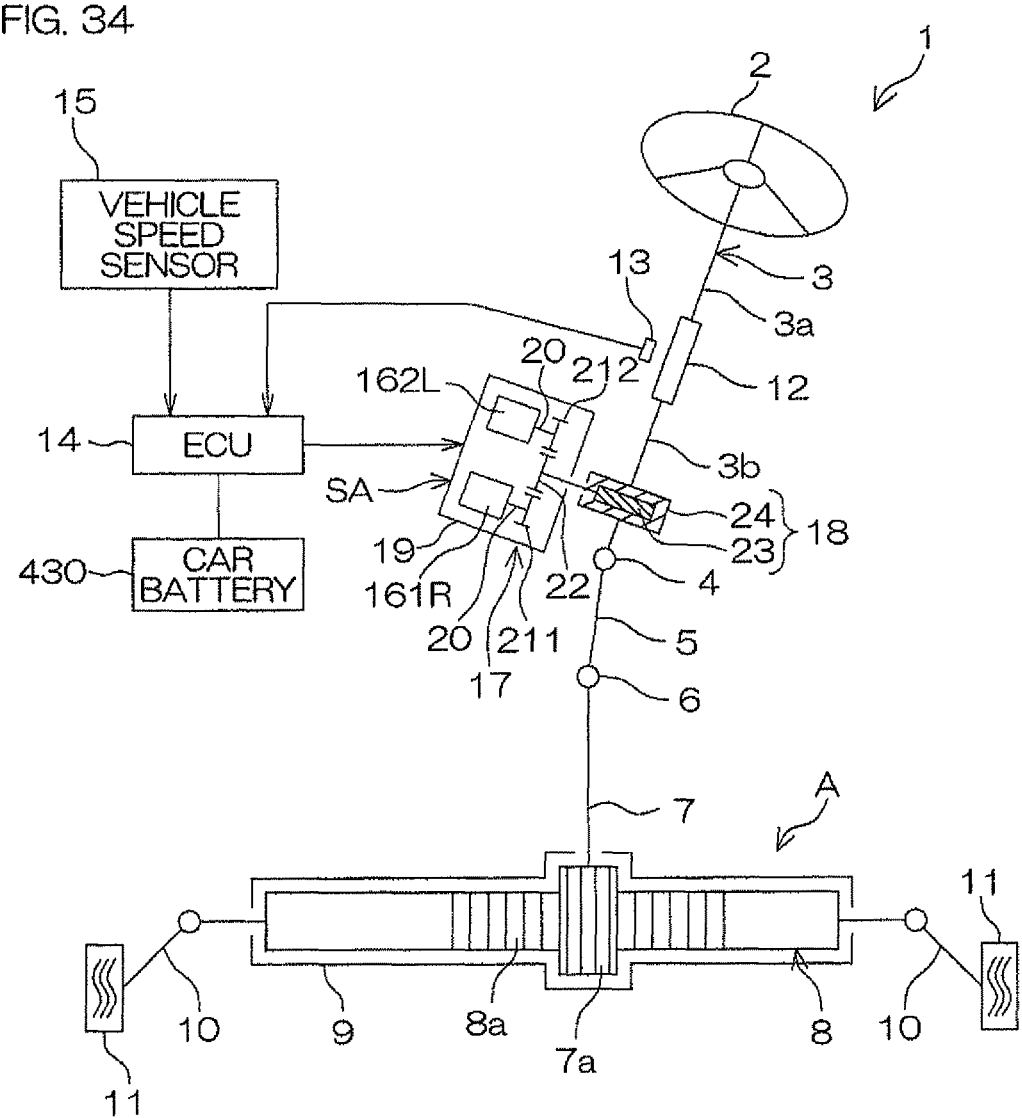
FIG. 34 is a schematic view showing a general configuration of an electric power steering device as a vehicle steering apparatus of still another embodiment of the present invention.

Referring to FIG. 34, the present embodiment is different from the embodiment of FIG. 1 mainly in that a rightward steering motor 161R equivalent to the first electric motor 161 of the embodiment of FIG. 1 and a leftward steering motor 162L equivalent to the second electric motor are provided.

The electric power steering device 1 assists steering as follows in order to reduce the burden on a driver. The torque sensor 13 detects a steering torque applied to the steering shaft 3 by an operation of the steering member 2, and outputs a steering torque signal Ts showing the steering torque. It is assumed that the sign of the detected steering torque is positive in the case of rightward steering, and is negative in the case of leftward steering. The vehicle speed sensor 15 detects a speed of the vehicle (vehicle speed), and outputs a vehicle speed signal Vs showing the vehicle speed.

The ECU 14 is supplied with electric power from a car battery 430, and drives the rightward steering motor 1618 and the leftward steering motor 163L based on the steering torque signal Ts and the vehicle speed signal Vs. Typically, the rightward steering motor 161R generates a rightward (clockwise) steering assist force, and the leftward steering motor 162L generates a leftward (counterclockwise) steering assist force when they are driven by the ECU 14 although details will be described later.

The steering assist forces generated by the rightward steering motor 161R and the leftward steering motor 162L are applied to rotate the steering member 2 via the first speed reduction mechanism 17 and the second speed reduction mechanism 18. As a result, the steering shaft 3 is rotated by the steering torque applied to the steering member 2 and the steering assist force generated by either one (both in the case of steering without driving described later) of the rightward steering motor 161R and the leftward steering motor 162L.

Thus, the electric power steering device assists steering by applying a steering assist force generated by either one of the two steering motors to the steering mechanism of the vehicle. Thus, usually, two steering motors are not used concurrently, so that the durability of the motors can be improved. Hereinafter, referring to FIG. 35, driving of the rightward steering motor 161R and the leftward steering motor 162L will be described in greater detail.

Figure 35:
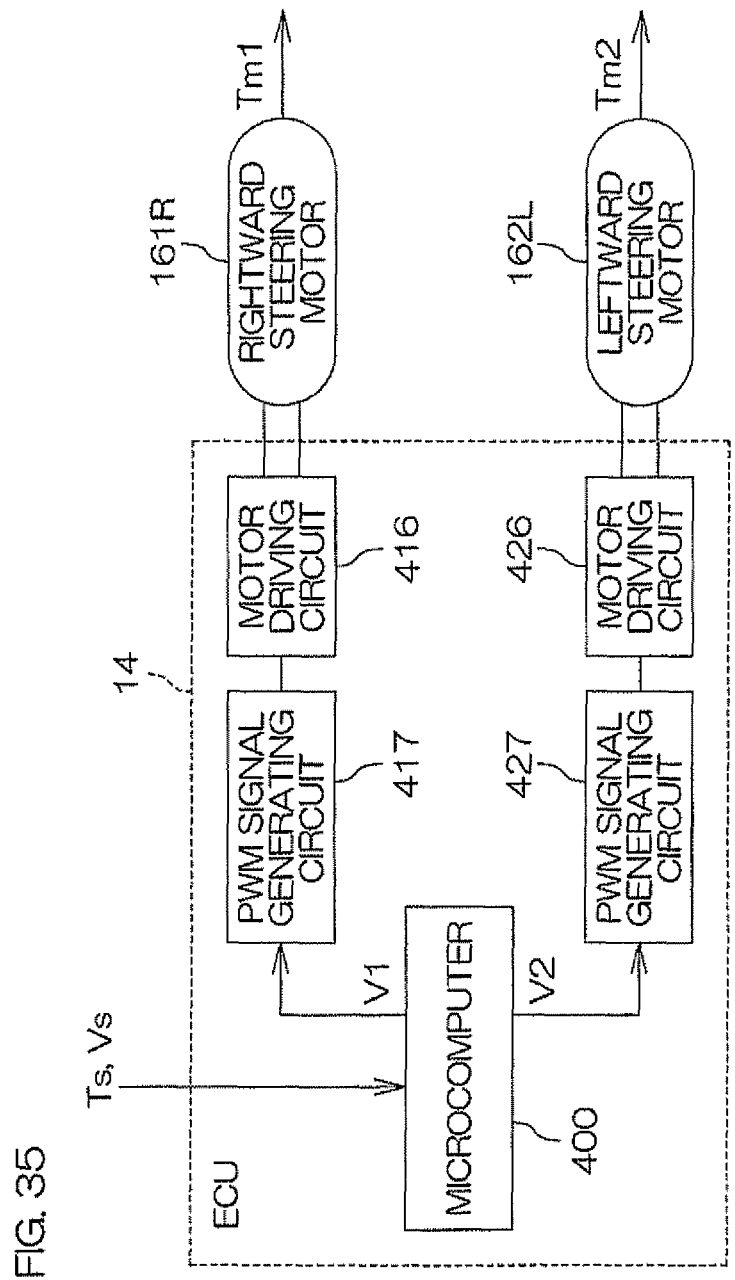
FIG. 35 is a block diagram showing details of an ECU in the embodiment of FIG. 34.

FIG. 35 is a block diagram showing details of the ECU 14 provided in the electric power steering device 1 in the present embodiment. As shown in FIG. 35, the ECU 14 functions as a drive control section for the motors 161R and 162L, and includes a microcomputer 400, a motor driving circuit 416 that drives the rightward steering motor 161R, a motor driving circuit 426 that drives the leftward steering motor 162L, a PWM signal generating circuit 417 that generates a PWM (Pulse Width Modulation) signal for controlling the motor driving circuit 416, and a PWM signal generating circuit 427 that generates a PWM signal for controlling the motor driving circuit 426. Into the microcomputer 400, the steering torque signal Ts output from the torque sensor 13 and the vehicle speed signal Vs output from the vehicle speed sensor 15 are input. The microcomputer 400 performs drive control of the rightward steering motor 161R and the leftward steering motor 162L by executing a program stored in a semiconductor memory (not shown) installed inside the ECU 14. In detail, the microcomputer 400 outputs a command voltage signal V1 for controlling the driving electric current of the rightward steering motor 161R and a command voltage signal V2 for controlling the driving electric current of the leftward steering motor 162L based on the steering torque signal Ts and the vehicle speed signal Vs.

Specifically, the microcomputer 400 calculates necessary steering assisting direction and a steering assist force based on the steering torque signal Ts and the vehicle speed signal Vs and calculates an amount of an electric current that should be supplied to the rightward steering motor 161R or the leftward steering motor 162L for generating the steering assist force. Further, when turning-back is performed as described later, the microcomputer 400 calculates an amount of an inertia compensating electric current that should be supplied to the rightward steering motor 161R or the leftward steering motor 162L that generated a steering assist force before turning-back. The microcomputer 400 outputs command voltage signals V1 and V2 corresponding to these amounts to the PWM signal generating circuits 417 and 427.

When turning-back is not performed as described later, the microcomputer 400 outputs a command voltage signal V1 or V2 corresponding to a dither current that should be supplied to the rightward steering motor 161R or the leftward steering motor 162L not generating a steering assist force to the PWM signal generating circuit 417 or 427.

The PWM signal generating circuits 417 and 427 are PWM modulators that generate pulse width modulation signals (PWM signals) at duty ratios corresponding to the command voltage signals V1 and V2 output from the microcomputer 400. The motor driving circuit 416 is supplied with electric power from the car battery 430 and controlled by a PWM signal having a duty ratio corresponding to the command voltage signal V1 from the PWM signal generating circuit 417 to drive the rightward steering motor 161R. Similarly, the motor driving circuit 26 is controlled by a PWM signal having a duty ratio corresponding to the command voltage signal V2 from the PWM signal generating circuit 427 to drive the leftward steering motor 162L.

Accordingly, on the rotary shaft of the rightward steering motor 161R, a torque Tm1 corresponding to the electric current amount calculated by the microcomputer 400 is generated. Similarly, on the rotary shaft of the leftward steering motor 162L, a torque Tm2 corresponding to the electric current amount calculated by the microcomputer 400 is generated. On the motor that is supplied with a dither current described later, a torque is not generated. Hereinafter, referring to FIG. 36, a control operation of the microcomputer 400 will be described.

Figure 36:
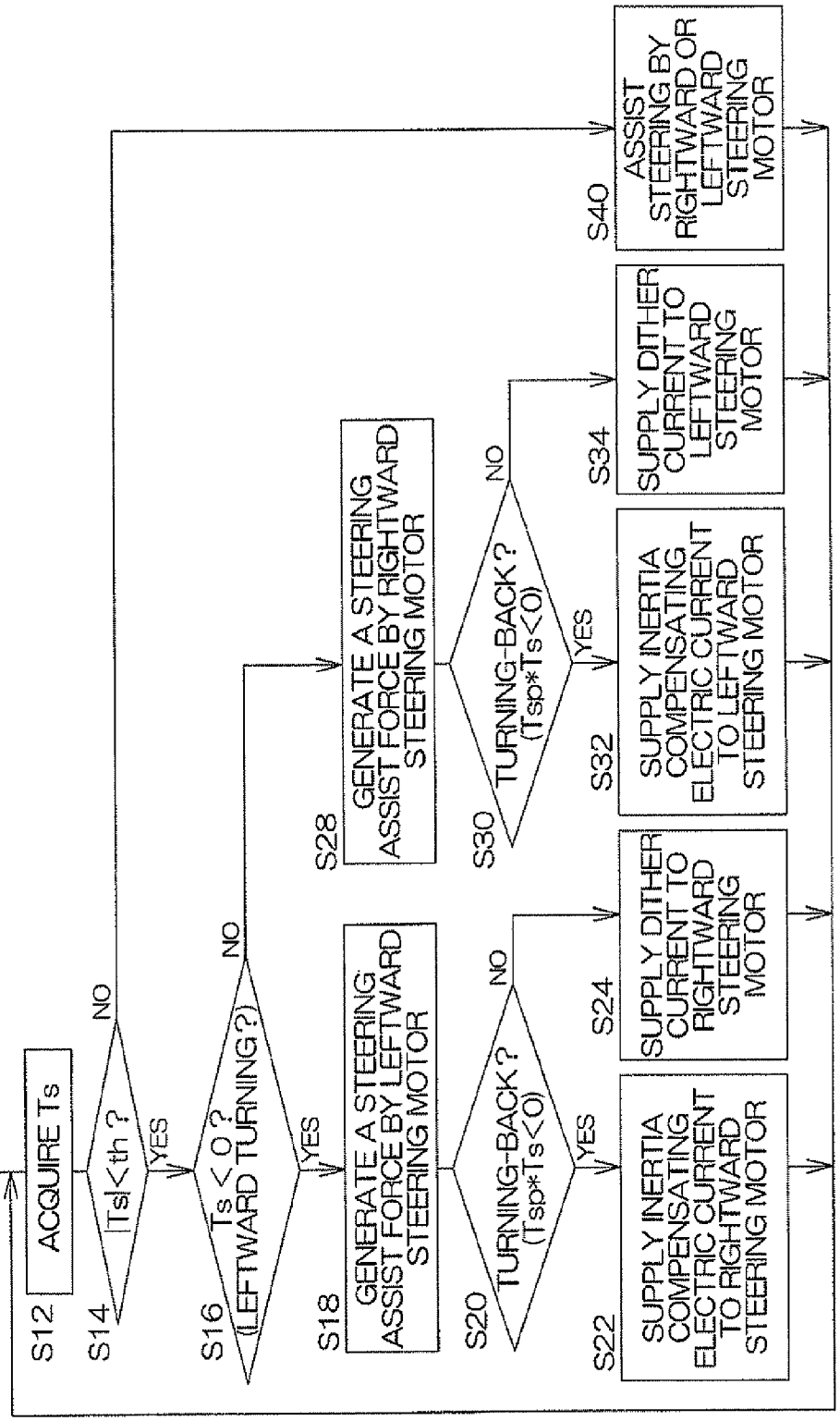
FIG. 36 is a flowchart showing a flow of processing in a microcomputer in the embodiment of FIG. 34.

FIG. 36 is a flowchart showing a flow of processing in the microcomputer 400. At Step S12 shown in FIG. 36, the microcomputer 400 acquires a detected value shown by a steering torque signal Ts from the torque sensor 1 (hereinafter, referred to as "steering torque Ts", simply). As described later, the steering torque Ts (or a sign thereof) is temporarily stored in a semiconductor memory not shown.

Next, at step S14, the microcomputer 400 judges whether the absolute value of the steering torque Ts is less than a predetermined threshold th (herein, 2 (Nm) although this value can be arbitrarily determined). As a result of this judgment, when the absolute value is less than the threshold th (Yes at Step S14), the process advances to Step S16. On the other hand, as a result of judgment, when the absolute value is not less than the threshold (No at Step S14), the process advances to Step S40 and either the rightward steering motor 161R or the leftward steering motor 162L is arbitrarily driven so that the same steering assistance as in the conventional electric power steering device (with two leftward and rightward steering motors) is performed. Thereafter, the process returns to Step S12.

At this Step S40, as in the case of the conventional electric power steering device with leftward and rightward steering motors, while either of one motor generates a steering assist force, the other motor stops. Therefore, the durability of the electric motors can be improved, and the control to generate the dither current and the inertia compensating electric current described later can be omitted.

In this case, although delay caused by friction of the other motor (for example, the rightward steering motor 161R) with one motor (for example, the leftward steering motor 162L) cannot be reduced (eliminated, ideally), the case where the friction torque Ts is thus comparatively small is typically when cornering without fine handle turning. Therefore, a driver hardly feels the influences of the inertia and friction of the motors, for example, discontinuity of the steering assist force, and it is always necessary to reduce influences of the friction and inertia of the motors by supplying a dither current and an inertia compensating electric current.

In order to strengthen the steering assist force at the time of steering without driving, etc., for example, when the absolute value of the steering torque Ts exceeds 5 (Nm), the two leftward and rightward steering motors may be actuated concurrently (in the same rotation direction).

Subsequently, at Step S16, the microcomputer 400 judges whether the steering torque Ts is less than zero, that is, whether the steering wheel is turned to the left. The microcomputer 400 that performs this judgment functions as a direction detection device that detects a direction of steering by a driver. As a result of the above-described judgment, when the steering wheel is turned to the left (Yes at Step S16), the process advances to Step S18, and when the steering wheel is turned to the right (No at Step S16), the process advances to Step S28. As described below, the processes of the Steps S18 to S24 are the same as those of Steps S28 to S34 except that the left and right are reversed, so that the processes of Step S28 and subsequent steps will be briefly described while describing the processes of Step S18 and subsequent steps.

At Step S18, the microcomputer 400 calculates necessary steering assisting direction and steering assist force based on the steering torque signal Ts and the vehicle speed signal Vs, calculates an amount of an electric current that should be supplied to the leftward steering motor 162L for generating the steering assist force, and outputs a command voltage signal V2 corresponding to the amount to the PWM signal generating circuit 427.

Here, for example, known feedback control is performed according to proportional-plus-integral control computation based on a deviation It-Is between a target value It of the electric current that should be supplied to the motor and a detected value Is of a electric current flowing in the motor. Similarly, at Step S28, the microcomputer 400 also outputs a command voltage signal V1 corresponding to an amount of an electric current that should be supplied to the rightward steering motor 161R to the PWM signal generating circuit 417.

Next, at Step S20, the microcomputer 400 reads a steering torque Ts or sign information thereof as of a predetermined time ago stored in a semiconductor memory, etc., as a previous steering torque Tsp, and judges whether a result of multiplication of a current steering torque and the read value is negative, that is, whether the direction of the torque is reversed and the steering wheel is in a turning-back steering state.

The reason for reading not a steering torque Tsp as of just before but a steering torque Tsp as of a predetermined time ago is for giving a necessary time for the process of Step S22 described later, so that after the above-described judgment is made by reading a steering torque Tsp as of just before, if turning-back is detected, thereafter, a process to hold the turning-back detection state for the predetermined time may be performed unless turning-back is newly detected. The microcomputer 400 that makes the above-described judgment functions as a turning-back detection device.

As a result of this judgment, when turning-back is judged (Yes at Step S20), at the next Step S22, the microcomputer 400 calculates an inertia compensating electric current that should be supplied to the rightward steering motor 161R that generated a steering assist force before turning-back, and outputs a command voltage signal V1 corresponding to the amount to the PWM signal generating circuit 417. This inertia compensating electric current is for compensating delay electrically or mechanically caused by various time constants including inertia of the motors and steering system and a dead zone of the control system when the motor that assists steering is switched as described above, and can be calculated by predetermined calculation, simulation, and actual measurement, etc. Hereinafter, this compensation will be described in detail with reference to FIG. 37 to FIG. 39.

Figure 37:
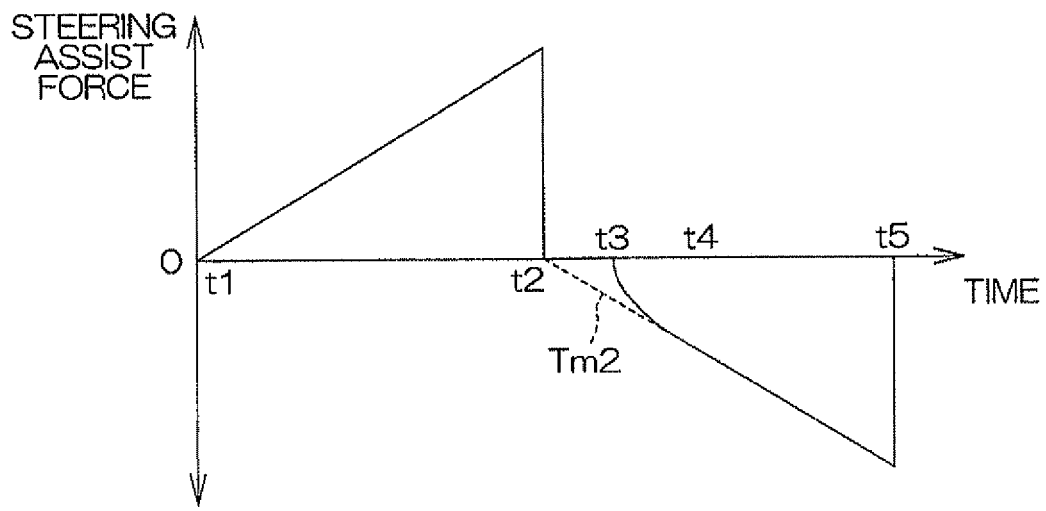
FIG. 37 is a diagram showing a conventional example of a time-related change in steering assist force when compensation by an inertia compensating electric current is not performed in the embodiment of FIG. 34.
Figure 38:
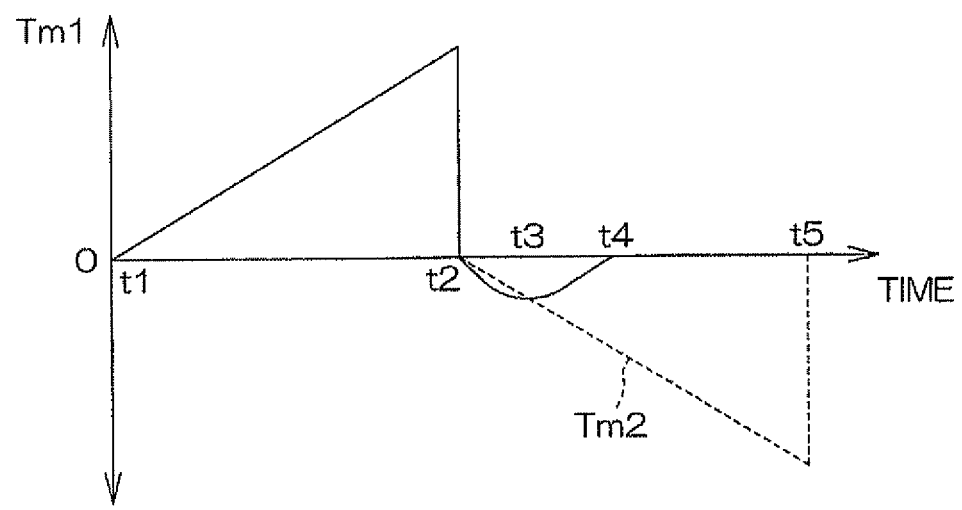
FIG. 38 is a diagram showing an example of a time-related change in generated torque Tm1 generated by a rightward steering electric motor in the embodiment of FIG. 34.

FIG. 37 is a diagram showing a conventional example of a time-related change in steering assist force when the compensation is not performed, and FIG. 38 is a diagram showing an example of a time-related change in torque Tm1 generated by the rightward steering motor 162R. The dotted line in FIG. 37 or 38 briefly shows an example of a time-related change in torque Tm2 generated by the leftward steering motor 162L. This torque becomes equal to the steering assist force when no mechanical and electrical delay occurs.

In FIG. 37 to FIG. 39, from time t1 to time t2, the leftward steering motor 162L does not generate the torque Tm2, and during this, the torque Tm1 generated by the rightward steering motor 161R is shown by a simple form by ignoring the above-described delay so that the torque Tm1 becomes equal to the steering assist force.

Here, in FIG. 37, at the time T2 at which the steering wheel is turned-back from the right to the left by a driver, generation of the torque Tm1 in the rightward steering motor 161R is stopped, and the torque Tm2 is generated in the leftward steering motor 162L. However, actual generation of a steering assist force by the leftward steering motor 162L is after the time t3, and from the time t3 to the time t4, the torque Tm2 generated by the leftward steering motor 162L is not equal to the steering assist force. This delay is an example of a delay electrically or mechanically caused by various time constants including inertia of the motors and steering system and a dead zone of the control system, and typically, includes a delay caused by inertia due to sudden reversing leftward of the rightward steering motor 161R that generated a high rightward torque until just before the time t2.

Therefore, the rightward steering motor 161R is driven by the inertia compensating electric current set in advance so as to compensate the delay to generate the torque Tm1 in a direction opposite to the rightward direction that is the rotation direction of the main body without stop from the time t2 to the time t4 as shown in FIG. 38.

Thus, by driving the rightward steering motor 161R from the time t2 to the time t4 (in the opposite direction), the steering assist force gently changes continuously as shown in FIG. 39. Therefore, the steering feeling can be improved without causing an uncomfortable feeling (feeling of discontinuity).

At Step S22, the microcomputer 400 operates as described above, and then the process returns to Step S12. At Step S32, the microcomputer 400 operates in the same manner except that the turning-back direction is reverse, and thereafter, the process returns to Step S12.

As a result of the above-described judgment at Step S20, when steering is not turning-back (No at Step S20), subsequently at Step S24, the microcomputer 400 calculates an amount of a dither current that should be supplied to the rightward steering motor 161R not generating a steering assist force, and outputs a command voltage signal V1 corresponding to the amount to the PWM signal generating circuit 417.

In detail, the dither current is supplied to the leftward steering motor 162L, for example, from the time t1 to the time t2 in FIG. 37, and supplied to the rightward steering motor 161R from the time t4 to the time t5 in FIG. 38. By this dither current, influences of the friction, etc., of the other motor (to be supplied with the dither current) with one motor to be driven to generate a steering assist force can be reduced (eliminated, ideally).

Specifically, this dither current is an electric current that is supplied to a motor (herein, a motor not generating a steering assist force) to reduce torque loss and delay caused by frictional heat, etc., of the motor, and more specifically, an electric current that changes with a predetermined short period in a range from a maximum electric current value that does not cause the rightward steering motor 161R to generate a torque Tm1 to an electric current value of zero. The predetermined short period may be any period such as a period several times a control period unless the period is so long that the influences of frictions etc., of a motor cannot be reduced. The waveform of the dither current is not especially limited and may be a sine wave, a sawtooth wave, or a square wave, etc., as long as it can reduce the influences of frictions, etc., of a motor. The dither current may cause a motor to generate a very small torque Tm1, and as long as a driver cannot feel the torque Tm1, the torque does not become a problem.

Instead of the above-described configuration, it is also possible that a dither current generating circuit that generates the dither current is newly provided, and at this Step S24, the microcomputer 400 sets the command voltage signal V1 to zero and does not use the PWM signal generating circuit 417 and the motor driving circuit 416, and controls the dither current generating circuit so as to directly supply a dither current output from the dither current generating circuit to the rightward steering motor 161R. In this configuration, it becomes possible to supply a dither current that is converted with a period shorter than the control period to the motor, and the ECU 14 including this dither current generating circuit functions as a drive control section.

At Step S24, the microcomputer 400 operates as described above and then the process returns to Step S12. At Step S34, the microcomputer 400 also operates in the same manner except that the turning-back direction is reverse, and thereafter, the process returns to Step S12.

At Step S34, unlike the dither current that is supplied at Step S24, the dither current that is supplied to the leftward steering motor 162 is an electric current that changes with a predetermined short period in a range from a minimum electric current value that does not cause the leftward steering motor 162L to generate a (negative) torque Tm2 to an electric current value of zero.

It is described that these dither currents change in a range from a maximum electric current value or a minimum electric current value to an electric current value of zero, and this change is just enough to provide the effect of reducing the influence of friction, and the range of this change is not limited as long as it does not exceed the absolute value of the maximum electric current value or the minimum electric current value, and for example, a change from the maximum electric current value to the minimum electric current value is also possible.

As described above, according to the electric power steering device 1 of the present embodiment, when turning-back is not detected, by a dither current described above, the influence of delay caused by friction, etc., of the other motor (to be supplied with the dither current) with respect to one motor to be driven to generate a steering assist force can be reduced (eliminated, ideally).

According to the electric power steering device 1 according to the present embodiment, when turning-back is detected, influences of mechanical and electrical delay including delay caused by inertia of the other motor (to be supplied with the above-described inertia compensating electric current) with respect to one motor to be driven to generate a steering assist force can be reduced (eliminated, ideally) by the inertia compensating electric current.

The present invention is applicable not only to a column-assist type electric power steering device that applies a steering assist force to the steering shaft but also to a pinion-assist type electric power steering device that applies a steering assist force to the pinion shaft. Further, the present invention is also applicable to a composite-type electric power steering device including electric motors connected to different members. The number of electric motors may be not less than three.

The present invention is applicable not only to electric power steering devices but also to a vehicle steering apparatus that converts an operation of a steering member by a driver into turning of steered wheels, such as steer-by-wire systems (specifically, a steering reaction force torque generating motor of a steer-by-wire system) in which mechanical joining between a steering member and a steering mechanism is omitted and a steering device in which a ratio of a steered angle of steered wheels to a steering angle of a steering member is made variable by a differential gear mechanism. A direction of a steering reaction force and a direction of a steering assist force are opposite to each other, so that when the present invention is applied to a steering reaction force torque generating motor, the rightward steering motor in the embodiment described above is replaced by a motor that generates a leftward steering reaction force, and the leftward steering motor is replaced by a motor that generates a rightward steering reaction force.

The present invention is described in detail above according to a detailed embodiment, however, a person skilled in the art who understands the contents described above will easily conceive of alterations, modifications, and equivalents. Therefore, the present invention should cover the scope of the claims and equivalents thereof.

The present application corresponds to Japanese Patent Applications No. 2008-184331, No. 2008-184332, No. 2008-184333, No. 2008-184334, No. 2008-271236, and No. 2008-316574 filed in Japan Patent Office on Jul. 15, 2008, the entire disclosure of which is incorporated herein by reference.

DESCRIPTION OF REFERENCE NUMERALS

1: Electric power steering device (vehicle steering apparatus), 2: Steering member, 3: Steering shaft, 5: Intermediate shaft, 7: Pinion shaft, 8: Rack bar, 11: Steered wheel, 13: Torque sensor (direction detection device, turning-back detection device), 14: ECU (drive control section, direction detection device, turning-back detection device), 161, 162, 163, 164, 161R, 162L: Electric motor (actuator), 17, 17A, 17B, 17C, 17D, 17E, 17F, 17G, 17H, 17K, 17L: First speed reduction mechanism, 18: Second speed reduction mechanism, 19, 19E, 19L: Housing, SA, SA1: Sub-assembly, 20: Rotary shaft, 211, 212, 213, 214, 215, 216: Drive gear (drive member), 22, 221, 222, 223, 224, 225, 226, 227, 228: Driven gear (driven member), 22a: Inner periphery, 22b: Outer periphery, 225a: Inner periphery, 23: Worm shaft, 24: Worm wheel, 25, 251: Base plate, 26, 261: Motor fixing plate (motor fixing member), 27, 27E: Gear housing, 32: Pivot, 35: First bearing, 36: Second bearing, 39: Motor housing, 45: Cover housing, 46: Cylindrical portion, 47: End wall, 47a: Inner surface, 74, 74A, 74B: Rotation angle sensor (rotation angle detection device), 811, 814: Drive pulley (drive member inscribed about endless belt), 812, 813: Drive pulley (drive member circumscribed about endless belt), 82: Driven pulley (driven member), 83: Endless belt, 130, 130A: Connection member, 131, 131A: External coupler, 132: Power cable (external wiring), 133: Coupler, 134: Power supply, 135, 135A: First terminal, 136, 136A: Second terminal, 137, 137A: Internal coupler, 140, 140A: Third terminal, 142: Conductive member, 143: Flexible printed board, 330: Bearing, A: Rack-and-pinion mechanism (steering mechanism), B: Power transmission region, X1, X2: Tooth trace direction

What is claimed is:

1. A vehicle steering apparatus comprising:
   an actuator that generates a steering force;
   a first speed reduction mechanism connected to the actuator;
   a second speed reduction mechanism connected to the first speed reduction mechanism; and
   a steering mechanism connected to the second speed reduction mechanism, wherein
     a sub-assembly that includes the actuator and the first speed reduction mechanism is configured,
     the actuator includes a plurality of electric motors each of which includes a rotary shaft,
     the first speed reduction mechanism includes a plurality of drive members and a common driven member that follows the drive members, and
     the drive members are connected to the rotary shafts of the corresponding electric motors, and joined to the driven member in a power transmittable manner.

2. The vehicle steering apparatus according to claim 1, wherein
   the rotary shaft of each of the electric motors and a pivot of the driven member are parallel to each other.

3. The vehicle steering apparatus according to claim 2, wherein the drive members and the driven member of the first speed reduction mechanism include gears engaging with each other or pulleys joined to each other in a power transmittable manner via an endless belt.

4. The vehicle steering apparatus according to claim 2, wherein
   the driven member includes two helical gears joined to a same axis, and
   tooth trace directions of the two helical gears are different from each other.

5. The vehicle steering apparatus according to claim 1, wherein
   the plurality of drive members and the driven member are joined to each other in a power transmittable manner via an endless belt,
   the drive members are joined to the rotary shafts of the corresponding electric motors rotatably integrally, and
   the plurality of drive members include a drive member inscribed about the endless belt and a drive member circumscribed about the endless belt.

6. The vehicle steering apparatus according to claim 1, comprising: a rotation angle detection device that detects a rotation angle of the rotary shaft of any one of the plurality of electric motors, or any one of the drive members and the driven member.

7. The vehicle steering apparatus according to claim 1, comprising: a rotation angle detection device that detects a rotation angle of the driven member.

8. The vehicle steering apparatus according to claim 1, wherein
   in a power transmission region between the drive members and the driven member, a plurality of resilient bodies are interposed in a compressed state between the drive members and the driven member, and
   the plurality of resilient bodies apply resilient forces different from each other.

9. The vehicle steering apparatus according to claim 1, further comprising: a connection member that electrically connects the actuator to external wiring, wherein
   the sub-assembly includes a housing for housing the actuator and the first speed reduction mechanism,
   the connection member includes first and second terminals connectable to each other according to an operation of joining the actuator and the housing to each other, and
   the first and second terminals are disposed inside the housing.

10. The vehicle steering apparatus according to claim 9, wherein
    the housing includes a motor fixing member to which the plurality of electric motors are fixed,
    the first terminal is provided on the plurality of electric motors, and
    the second terminal is provided on internal coupler fixed to the motor fixing member.

11. The vehicle steering apparatus according to claim 9, wherein
    the housing includes a motor fixing member to which the plurality of electric motors are fixed, and a cover housing covering the plurality of electric motors and the motor fixing member, and
    the plurality of electric motors are disposed between an inner surface of an end wall of the cover housing and the motor fixing member, and
    the first terminal is provided on the plurality of electric motors, and
    the second terminal is provided on internal coupler fixed to the inner surface of the end wall of the cover housing.

12. The vehicle steering apparatus according to claim 11, wherein
    the connection member includes an external coupler disposed on the outer surface of the cover housing,
    the external coupler includes a third terminal, and
    the second terminal and the third terminal are connected to each other via a flexible printed board installed along an inner surface of the cover housing.

13. The vehicle steering apparatus according to claim 1, wherein
    the driven member includes an annular driven member,
    an inner periphery of the annular driven member is joined to the drive members in a power transmittable manner, and
    a lubricant is filled in a power transmission region between the drive members and the annular driven member.

14. The vehicle steering apparatus according to claim 1, wherein
    the sub-assembly includes a housing for housing the actuator and the first speed reduction mechanism, and
    a lubricant is filled in the housing.

15. The vehicle steering apparatus according to claim 1, wherein the driven member includes an annular driven member having an inner periphery connected to the drive members in a power transmittable manner, and the first reduction mechanism includes a bearing supporting an outer periphery of the annular driven member.

16. The vehicle steering apparatus according to claim 1, wherein
    the plurality of electric motors further include:
    a first electric motor that generates a leftward steering force that should be applied to the steering mechanism or a rightward steering reaction force that should be applied to the steering member to be operated by a driver;
    a second electric motor that generates a rightward steering reaction force that should be applied to the steering mechanism or a leftward steering reaction force that should be applied to the steering member;

a turning-back detection device that detects a turning-back operation of the steering member; and a drive control section that drives either one of the first and second electric motors to generate a steering force or a steering reaction force in a corresponding direction, and supplies a driving electric current that does not generate a steering force or a steering reaction force to the other one of the first and second electric motors when the turning-back operation is not detected by the turning-back detection device.

17. The vehicle steering apparatus according to claim 16, wherein the turning-back detection device includes a direction detection device that detects a direction of steering by the driver, and when the direction detection device detects a leftward operation, the drive control section drives the first electric motor in a corresponding direction, and when the turning-back detection device detects the leftward operation as the leftward turning-back operation, the drive control section supplies an electric current that is for rotation in a direction opposite to the corresponding direction and compensates inertia caused when the rotation direction of the second electric motor mechanically joined to the first electric motor is reversed to the second electric motor, and when the direction detection device detects a rightward operation, the drive control section drives the second electric motor in a corresponding direction, and when the turning-back detection device detects the rightward operation as the rightward turning-back operation, the drive control section supplies an electric current for compensating the inertia to the first electric motor.

* * * * *

UNITED STATES PATENT AND TRADEMARK OFFICE
CERTIFICATE OF CORRECTION

PATENT NO.         : 8,708,089 B2                                    Page 1 of 1
APPLICATION NO.    : 13/054382
DATED              : April 29, 2014
INVENTOR(S)        : Kouji Kitahata et al.

It is certified that error appears in the above-identified patent and that said Letters Patent is hereby corrected as shown below:

On the Title Page

Item (73) should read:

Assignee:    ~~Jtekt Corporation~~ JTEKT CORPORATION

Signed and Sealed this
Thirtieth Day of September, 2014

Michelle K. Lee
*Deputy Director of the United States Patent and Trademark Office*